(12) United States Patent
Arikapudi et al.

(10) Patent No.: US 11,436,363 B1
(45) Date of Patent: *Sep. 6, 2022

(54) SECURE DOCUMENT SHARING IN A DATABASE SYSTEM

(71) Applicant: Snowflake Inc., Bozeman, MT (US)

(72) Inventors: Abhiram Arikapudi, Sammamish, WA (US); Saurin Shah, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,546

(22) Filed: Dec. 9, 2021

Related U.S. Application Data

(63) Continuation of application No. 17/302,390, filed on Apr. 30, 2021, now Pat. No. 11,216,581.

(60) Provisional application No. 63/201,481, filed on Apr. 30, 2021.

(51) Int. Cl.
| | |
|---|---|
| *G06F 21/62* | (2013.01) |
| *G06F 21/46* | (2013.01) |
| *G06F 21/78* | (2013.01) |
| *G06F 21/44* | (2013.01) |
| *G06F 21/31* | (2013.01) |

(52) U.S. Cl.
CPC .......... *G06F 21/6227* (2013.01); *G06F 21/31* (2013.01); *G06F 21/44* (2013.01); *G06F 21/46* (2013.01); *G06F 21/78* (2013.01)

(58) Field of Classification Search
CPC ...... G06F 21/6227; G06F 21/46; G06F 21/78; G06F 21/44; G06F 21/31
See application file for complete search history.

(56) References Cited

U.S. PATENT DOCUMENTS

| | | | |
|---|---|---|---|
| 10,970,532 B1 * | 4/2021 | Song | G06V 30/413 |
| 10,997,243 B1 * | 5/2021 | Paulus | G06F 16/908 |
| 2002/0083054 A1 * | 6/2002 | Peltonen | G06F 16/9535 |
| | | | 707/999.005 |
| 2003/0217272 A1 * | 11/2003 | Agrawal | G06F 21/10 |
| | | | 713/176 |
| 2004/0025018 A1 * | 2/2004 | Haas | H04W 12/106 |
| | | | 713/168 |

(Continued)

OTHER PUBLICATIONS

"U.S. Appl. No. 17/302,390, Non Final Office Action dated Jul. 23, 2021", 10 pgs.

(Continued)

*Primary Examiner* — James R Turchen
(74) *Attorney, Agent, or Firm* — Schwegman Lundberg & Woessner, P.A.

(57) ABSTRACT

Provided herein are systems and methods for secure document sharing in a database system. For example, a system includes at least one hardware processor and a memory. The memory stores instructions that cause the at least one hardware processor to perform operations including receiving a query for a data set from a client device. The data set is shared in a data exchange by a data provider. The operations further include retrieving a data file responsive to the query for the data set. A security function is applied to the retrieved data file to generate a modified data file. A scoped uniform resource locator (URL) associated with the modified data file is encoded for transmission to the client device. The scoped URL includes an encrypted hash with a storage location of the modified data file.

27 Claims, 14 Drawing Sheets

(56) References Cited

U.S. PATENT DOCUMENTS

| | | | | |
|---|---|---|---|---|
| 2009/0283583 A1* | 11/2009 | Cowburn | G06Q 10/087 | 235/494 |
| 2010/0192211 A1* | 7/2010 | Bono | G06F 21/6209 | 726/7 |
| 2014/0281535 A1* | 9/2014 | Kane | G06F 21/6209 | 713/168 |
| 2015/0269234 A1* | 9/2015 | Castellanos | G06F 16/254 | 707/602 |
| 2016/0011990 A1* | 1/2016 | Berengoltz | G06F 21/6218 | 711/152 |
| 2016/0142382 A1* | 5/2016 | Ziebell | H04L 63/104 | 713/168 |
| 2017/0257363 A1* | 9/2017 | Franke | H04W 12/069 | |
| 2017/0293766 A1* | 10/2017 | Schnjakin | H04L 63/102 | |
| 2018/0012032 A1* | 1/2018 | Radich | H04L 9/30 | |
| 2018/0145957 A1* | 5/2018 | Kasibhatla | H04L 63/0846 | |
| 2018/0367506 A1* | 12/2018 | Ford | H04W 12/02 | |
| 2019/0286636 A1* | 9/2019 | Bedard | G06F 16/248 | |
| 2019/0319942 A1* | 10/2019 | Blasi | G06F 21/33 | |
| 2019/0340264 A1* | 11/2019 | Yu | G06F 16/1865 | |
| 2020/0002671 A1 | 1/2020 | Przada et al. | | |
| 2020/0026710 A1* | 1/2020 | Przada | G06N 20/00 | |
| 2020/0042734 A1* | 2/2020 | Lee | G06F 16/245 | |
| 2020/0193033 A1* | 6/2020 | Kurmi | H04L 67/02 | |
| 2020/0236110 A1* | 7/2020 | Metzler | H04L 63/10 | |
| 2020/0311034 A1* | 10/2020 | Brand | G06F 3/0607 | |
| 2020/0314165 A1* | 10/2020 | Brand | H04L 9/0643 | |
| 2020/0401718 A1* | 12/2020 | Hennig | G06F 21/6281 | |
| 2020/0412768 A1* | 12/2020 | Hegde | H04L 63/10 | |
| 2021/0120307 A1* | 4/2021 | Bastable | H04L 9/3271 | |

OTHER PUBLICATIONS

"U.S. Appl. No. 17/302,390, Notice of Allowance dated Nov. 8, 2021", 10 pgs.

"U.S. Appl. No. 17/302,390, Preliminary Amendment filed May 4, 2021", 8 pgs.

"U.S. Appl. No. 17/302,390, Response filed Oct. 25, 2021 to Non Final Office Action dated Jul. 23, 2021", 15 pgs.

* cited by examiner

SECURE DOCUMENT SHARING IN A DATABASE SYSTEM

CROSS-REFERENCE TO RELATED APPLICATION

This application is a Continuation of U.S. patent application Ser. No. 17/302,390, filed Apr. 30, 2021, which claims the benefit of priority to U.S. Provisional Patent Application Ser. No. 63/201,481, filed Apr. 30, 2021, the contents of which are incorporated herein by reference in their entirety.

TECHNICAL FIELD

Embodiments of the disclosure relate generally to a network-based database system or a cloud data platform and, more specifically, to facilitating access and sharing of documents in a secure manner.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
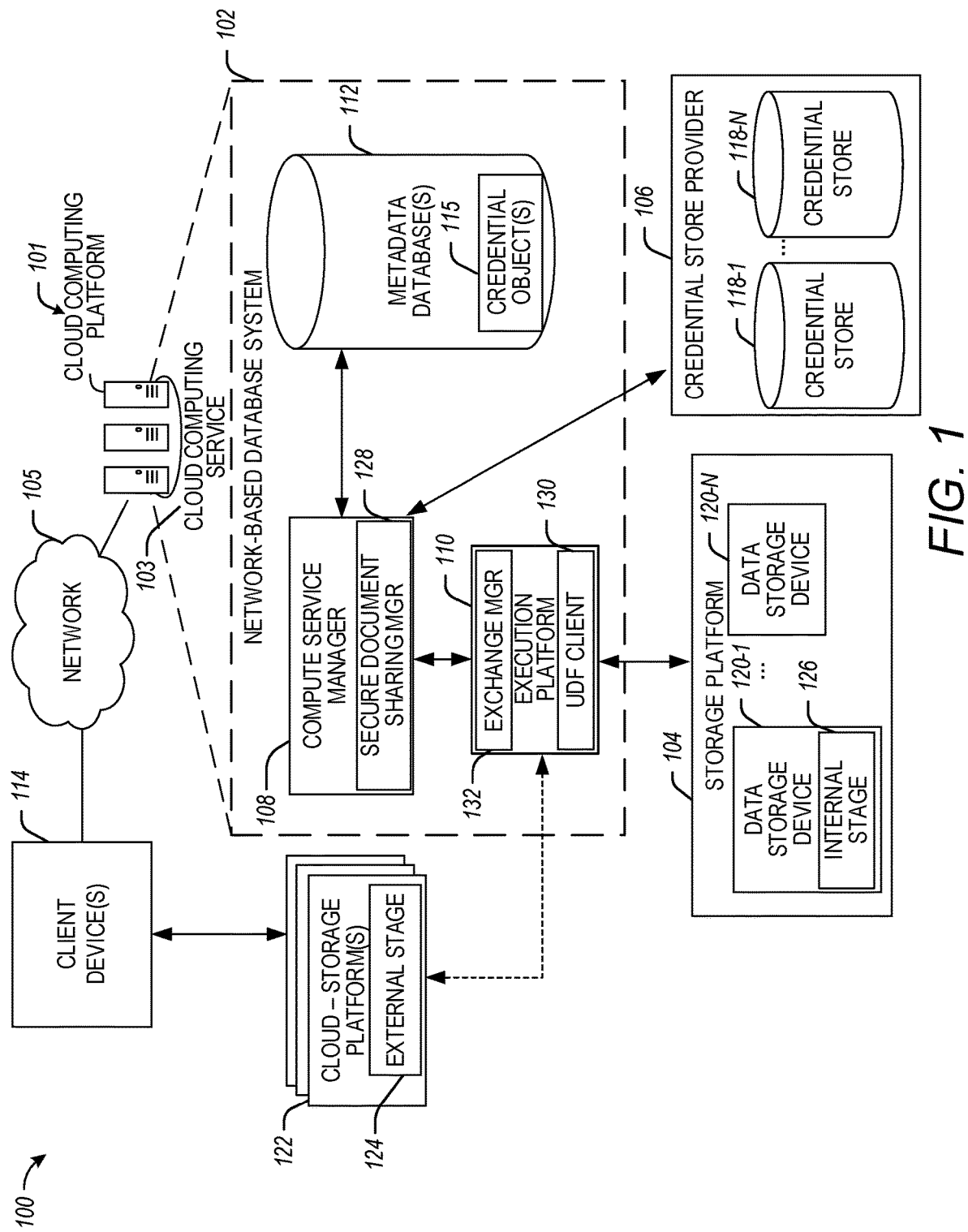
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As alluded to above, it is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. And as described below, a data platform could also use a cloud-storage platform as what is referred to herein as an internal storage location concerning the data platform.

From the perspective of an example data platform, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. Thus, in the parlance of this disclosure, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

Accordingly, a customer account on a data platform may include one or more account-level data sets that correspond respectively to one or more stages, one or more of which could be internal stages, and one or more of which could be external stages. One or more other types of stages could be implemented instead of and/or in addition to the internal stages and external stages that are described by way of example in the present disclosure. In some embodiments, a data set from the internal and/or external stages of a data provider may be shared (e.g., with one or more data consumers) in the data platform which may include a data exchange platform. In some aspects, the data set may include unstructured data files (e.g., image files, video files, PDFs, etc.) or other types of data files. Since the shared data set may include confidential or other types of sensitive data, securing the data set is a significant consideration for participating client devices (e.g., client devices associated with data providers or data consumers). Existing third-party secure sharing tools are time-consuming and cumbersome.

To address these and other shortcomings of prior implementations, disclosed herein are various embodiments of systems and methods for supporting secure document sharing in a database system such as a database system configured with a data exchange platform. The various embodiments that are described herein are described with reference where appropriate to one or more of the various figures.

In some embodiments, a data provider uses an exchange manager within a network-based database system to configure a data set (e.g., one or more unstructured files stored at internal or external stages of the data provider) for sharing within a data exchange platform. In some aspects, the shared data set may be a shared stage or a secure view shared with multiple data exchange accounts (e.g., data consumer accounts) within the data exchange or shared with a specific data consumer account.

In some aspects, a data provider loads documents that they intend to share with their customers into their data exchange listings. At this time, the provider can determine if a certain file can be downloaded by their data exchange customers (e.g., data consumers) freely, or if they would like to place security restrictions on a file (or a set of files).

A secure document sharing manager within the network-based warehouse system detects a query (e.g., from a computing device associated with a data consumer account) for the shared data set. The secure document sharing manager uses a UDF (e.g., a UDF executing with a sandbox environment) to retrieve a data file responsive to the query for the shared data set, and apply a security function to the retrieved data file to generate a modified data file with security restrictions. In some embodiments, the security function includes watermarking (e.g., adding a watermark to the file such as identification information of the data consumer account sending the query), an edit password lock (e.g., requiring a password for editing the file), or a read password lock (e.g., requiring a password for reading the file).

In some aspects, to perform watermarking, a data provider may choose to watermark the file being downloaded, with the account ID (or email ID) of the customer user that is downloading the shared file (or sending a query). In some embodiments, watermarking may be performed dynamically, at the time of the download.

In some aspects, to perform an edit password lock, before delivering a file to the customer, the secure document sharing manager can enforce an "edit" password lock with a randomly generated password. This functionality ensures that the file retains its integrity even after being downloaded by the customer, including disallowing the removal of the watermark.

In some aspects, to perform a read password lock, before delivering a file to the customer, the secure document sharing manager can enforce a "read" password lock with a randomly generated password. The "read" password can then be shared by the secure document sharing manager to the customer through a second factor (such as via email). In this case, the customer will need to input a password every time the file is opened.

In some embodiments, data providers may be allowed to enforce one or all of the above restrictions for each of the files they share in a data exchange platform.

In some embodiments, the data provider's customers access the data exchange platform and download the files they need from the provider's stage or secure view shared (with multiple or individual data consumers) on the data exchange platform. For example, a file (e.g., the modified data file or multiple modified data files) may be available as a link within a view, and data consumers can click on the link to download the file they need. Upon clicking on the link or initiating a query, the data consumer triggers the secure sharing functionalities discussed herein resulting in the communication of a scoped URL back to the data consumer. The scoped URL may be used to access the file after additional authentication functions are performed. If the provider chose to password lock (read or edit) the file, then the customer will receive the password separately (e.g., automatically, after the authentication is completed).

For example, the secure document sharing manager generates a scoped uniform resource locator (URL) associated with the modified data file for transmission to the computing device associated with the data consumer account. In some embodiments, the scoped URL includes an encrypted hash with a storage location of the modified data file as well as other information associated with the storage location of the modified data file, the query, the data consumer account sending the query, expiration period of the URL, etc.

After the scoped URL is communicated back to the computing device associated with the data consumer account, the secure document sharing manager detects when the URL is selected (e.g., a user of the client device selects/activates the URL) and performs additional authentication functions before providing the computing device associated with the data consumer account access to the modified data file in response to the query. For example, the secure document sharing manager may authenticate a user of the computing device communicating the query, validate that the user (or the computing device) generated/executed the query, validate that the scoped URL is not expired, and re-direct the user to a short-lived (e.g., 60 seconds) pre-signed URL of the modified data file as stored in the external or internal storage of the data provider.

Even though the present disclosure discusses secure sharing of unstructured (e.g., PDF) data files, the disclosure is not limited in this regard and the discussed techniques can be extended to other types of files. Additionally, the disclosed techniques may be used by data providers to obtain usage statistics for the documents that are being downloaded (e.g., from the data provider's account at a data exchange platform), which can help glean extensive understanding regarding consumption patterns for their product.

An example computing environment using a secure document sharing manager, an exchange manager, and a UDF client used in connection with secure sharing of documents is discussed in connection with FIGS. 1-4. Example functionalities in connection with securely sharing data in data exchange are discussed in connection with FIGS. 5-11. A more detailed discussion of secure document sharing functions performed in a computing environment as well as example computing devices that may be used is provided in connection with FIGS. 12-14.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with a network-based database system 102, a storage platform 104, and credentials store provider 106. The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other computation capabilities (e.g., secure data sharing between users of the cloud computing platform 101). In some embodiments, the cloud computing service 103 may relate to providing secure sharing of data in the cloud computing platform 101. The cloud computing platform 101 may include a three-tier architecture: data storage (e.g., storage platforms 104 and 122), an execution platform 110 (e.g., providing query processing), and a compute service manager 108 providing cloud services.

As shown, the network-based database system 102 of the cloud computing platform 101 is in communication with the cloud storage platforms 104 and 122 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 105, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122. Additionally, the compute service manager 108 may include a secure document sharing manager 128. The secure document sharing manager 128 comprises suitable circuitry, logic, interfaces, and/or code and is configured to perform functionalities discussed herein in connection with secure document sharing within the cloud computing platform 101. For example, the secure document sharing manager 128 is configured to detect queries for shared data and invoke security functions of a UDF client 130 configured in the execution platform 110. A more detailed description of functions performed by the secure document sharing manager 128 is provided in connection with FIG. 12 and FIG. 13.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110. In some embodiments, the execution platform includes an exchange manager 132 for configuring sharing of data sets (e.g., sharing of a stage or secure views) within a data exchange platform.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
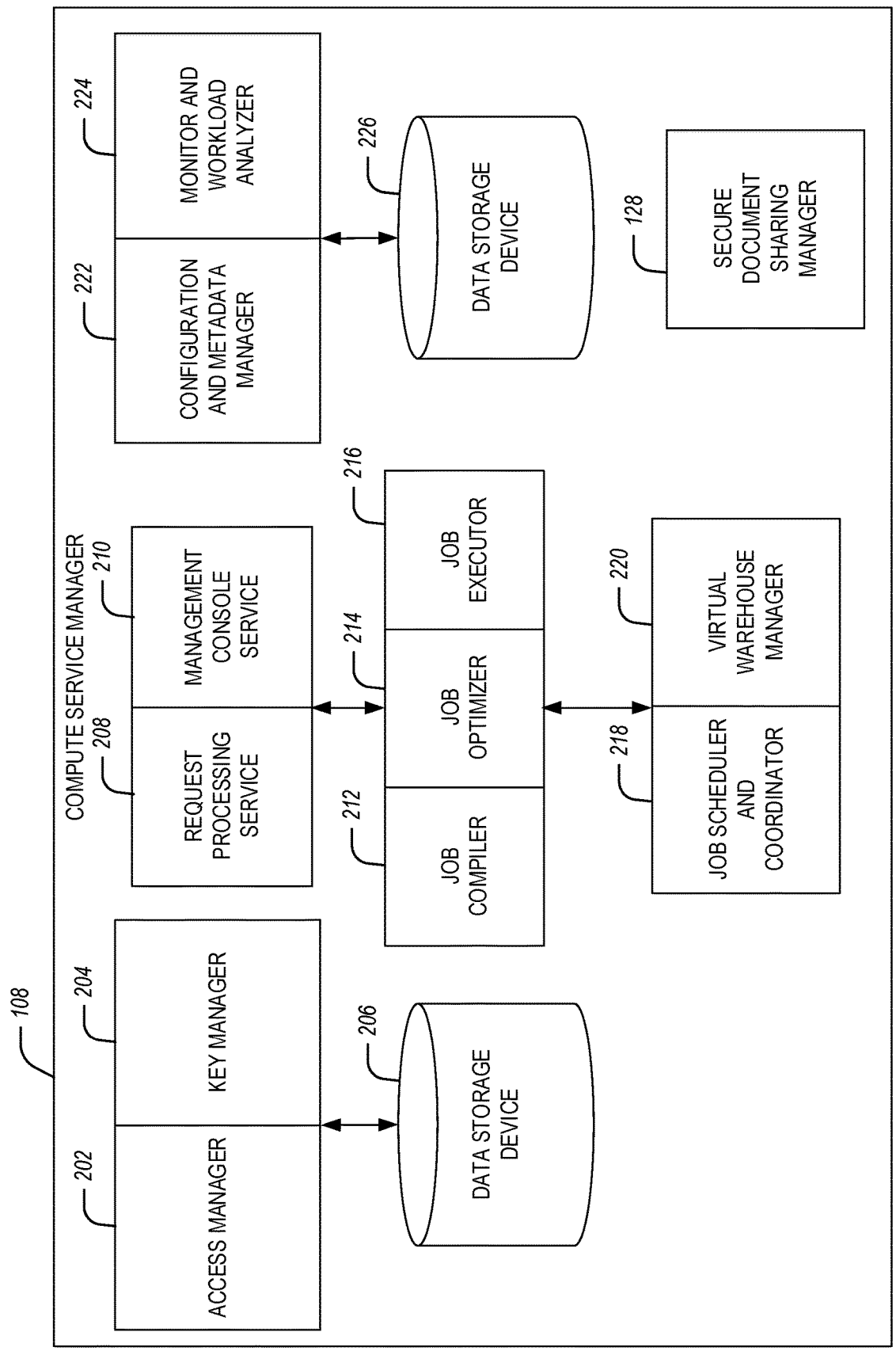
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As mentioned above, the compute service manager 108 may include a secure document sharing manager 128. The secure document sharing manager 128 comprises suitable circuitry, logic, interfaces, and/or code and is configured to perform functionalities discussed herein in connection with secure document sharing within the cloud computing platform 101. For example, the secure document sharing manager 128 is configured to detect queries for shared data and invoke security functions of a UDF client 130 configured in the execution platform 110 for applying the security functions to a data file (e.g., a file or other data that is being shared in data exchange and is a subject of a query from a data consumer) and generate the modified data file (e.g., including a watermark or password protection). The secure document sharing manager 128 further generates the scoped URL (or obtains the scoped URL from the UDF client) and communicates the scoped URL to the data consumer originating the query. After the data consumer selects (or activates) the scoped URL, the secure document sharing manager 128 may perform additional authentication functions before granting the data consumer access to the modified data file.

In some embodiments, the secure document sharing manager 128 may facilitate the execution of one or more defined functions, which may be used (e.g., by a data provider) in connection with secure sharing of data within the cloud computing platform 101.

In at least one embodiment of the present disclosure, the cloud computing platform 101 provides one or more functions or application programming interfaces (APIs) for use by, e.g., customers, internal developers, external developers, and/or the like of the cloud computing platform 101 in connection with accessing data stored in a data lake. A data lake is defined as a central repository where data providers and data consumers store their structured, semi-structured, or unstructured data. For example, a data lake may include table storage (e.g., table stages and internal storage), external stages, and internal stages.

Some functions and APIs are described by way of example below. In this disclosure, functions are referenced using a "function_name( )" notation, where "function_name" is the name of a given function, and where the empty parentheses (i.e., the "( )") at the end of the function name identify it as being a function (as opposed to, e.g., a stage, a stage-property name, a data value, etc.). It is further noted that the "( )" at the end of a given function name in no way implies that the function takes zero arguments: it could, but it could just as well take one or more arguments as described by way of example herein. As some options, in at least one embodiment, any one or more of these functions can be called within Java functions, within JavaScript stored procedures, as predicates within Structured Query Language (SQL) statements, and/or the like.

In some embodiments, a SELECT command may be used to query file contents (in both internal and external stages). Additionally, LS, RM, GET, PUT, INSERT, and DELETE commands may be used for both internal and external stages. In some embodiments, the secure document sharing manager 128 may invoke the secure sharing functions discussed herein (e.g., applying security functions 413 by UDF client 412 as discussed in connection with FIG. 4) based on detecting execution of one or more of the following functions or APIs.

Example Get File Commands and APIs

GET SQL COMMAND may be used to obtain a file from a stage. This command may be supported for data stored in an internal stage or an external stage.

An example format of the command is as follows:
get @file_stage/folder1/folder2/file1.jpg.

The above command will get file1.jpg from the stage "file_stage". The file_stage can point to any cloud storage location. It can be in the same region as the data provider account, or cross-region, or cross-cloud. In some aspects, this command is executed by a user with a role that has GET privileges on the stage.

Get Rest API

The same action can also be achieved using a GET REST API with the following file proxy URL: https://my_account.snowflakecomputing.com/api/files/my_database/my_schema/my_stage/folder1/folder2/file1.jpg.

When a user tries to access a file using the URL above, the following functions may be performed by the secure document sharing manager 128: (a) Authenticate the user; (b) Validate that the user's role has USAGE privilege on the stage provided; (c) Optionally, validate that the user's role has READ privilege on the file in the stage; and (d) Redirect the user to a short-lived (e.g., one or several minutes) pre-signed URL of the file on the cloud provider storage. A more detailed description of file URLs, scoped URLs, and pre-signed URLs is provided in Table 1 below.

Get Rest API & Data Access/Analysis Platforms

In some aspects, the rest API described above requires an Oauth or a keypair authentication token to be passed in the headers. If a query returns these URLs in the result set, a user may click on these URLs and access the files referenced by the URLs.

When a user clicks on the URL, a rest API call is made to a database endpoint to fetch the files. In some aspects, as part of the rest API call, the required authentication headers may also be communicated.

Get API With Scoped URLs

In some embodiments, data providers may not have access to the stage but may have access to a view which hands over file URLs. In that case, the file URLs may be different. For example, consider this secure view below which returns all files for a particular hospital with the name Hospital_X. A data consumer may have SELECT privilege for this view, but not have privileges on the stage hospital_files:

create secure view files_hospital_x as
select get_file_url(@hospital_files, relative_file_path)
from hospital directory
where hospital_name='Hospital_X';

In this case, the file URLs generated by the secure document sharing manager 128 are of a different format. More specifically, the URLs are referred to as scoped URLs and are encoded so that the database, schema, stage, and file path are encoded therein. In some aspects, the encoded content may contain one or more of the following: user_id of the user executing the query, a file path, a query_id of the query that generated the file, have an expiration time of 24 hours and may be encoded. An example scoped URL includes:

https://my_account.snowflakecomputing.com/api/files/bXlfZGFOYWJhc2UvbXlfc2NoZW1hL215X3N0YWdlL2ZvbGR1cjEvZm9sZGVyMi9maWx1MQ.jp g.

In some embodiments, when a data consumer attempts to access a file using the URL above, the secure document sharing manager 128 may perform the following functions: (a) Authenticate the user; (b) Validate that the logged-in user was the one who executed the query; (c) Validate that the scoped URL is not expired; and (d) Redirect the user to a short-lived (60 sec) pre-signed URL of the file on the cloud provider storage.

Table 1 below provides a more detailed description of the characteristics of File URLs, scoped URLs, and pre-signed URLs which may be used in connection with secure document sharing functionalities discussed herein.

Sharing Files Using Scoped URLs and Get Rest API

In some aspects, a data provider may either share a stage via data sharing or share a secure view that returns encoded scoped URL. In aspects when a data provider shares a secure view, the secure view may be generated (e.g., using the exchange manager 132) as follows:

create secure view files_hospital_x as
select get_file_url(@hospital_files, relative_file_path)
from hospital_directory
where hospital_name='Hospital_X'.

Figure 10:
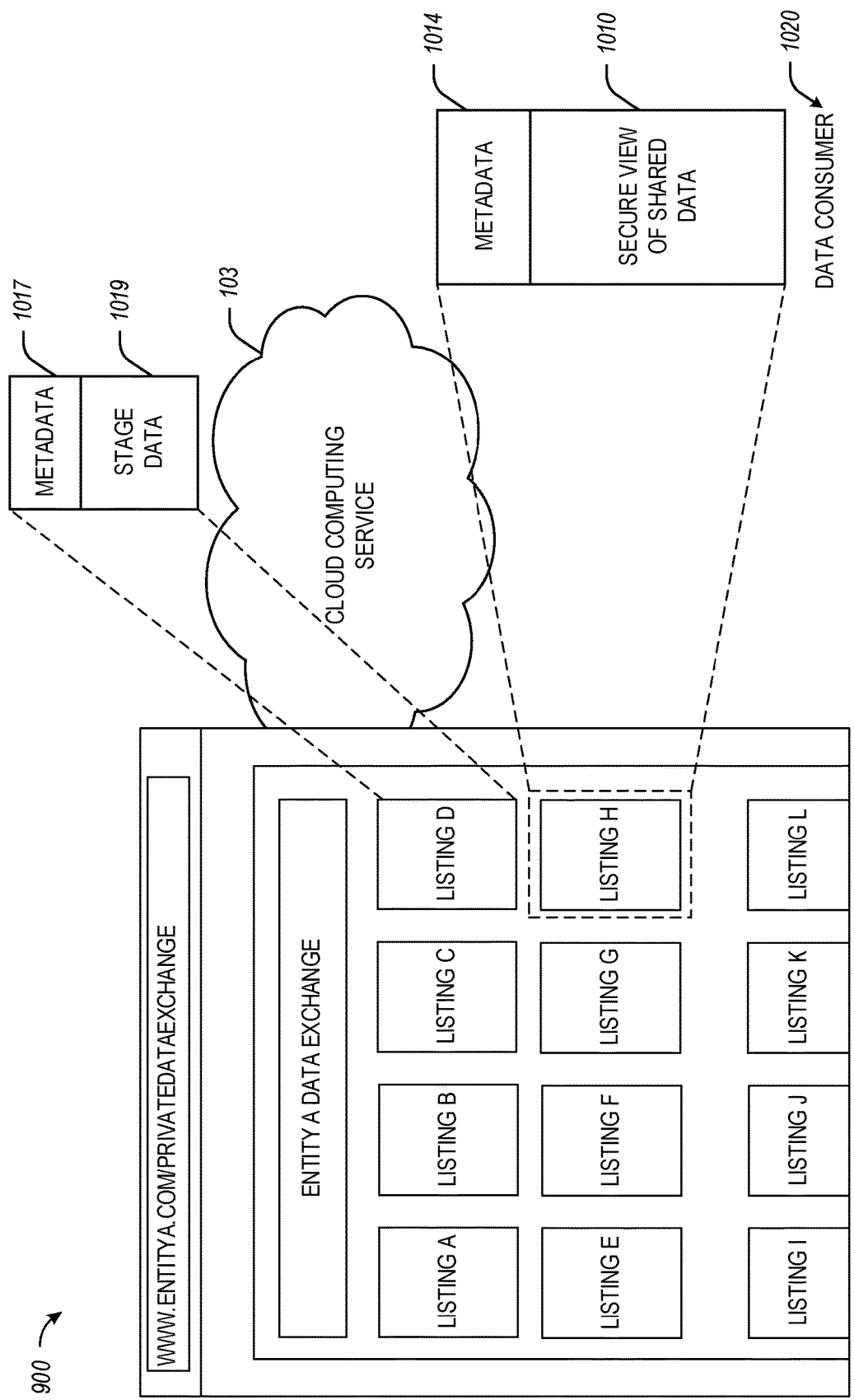
FIG. 10 is a diagram illustrating an example secure view of shared data from private data exchange, in accordance with some embodiments of the present disclosure.
Figure 11:
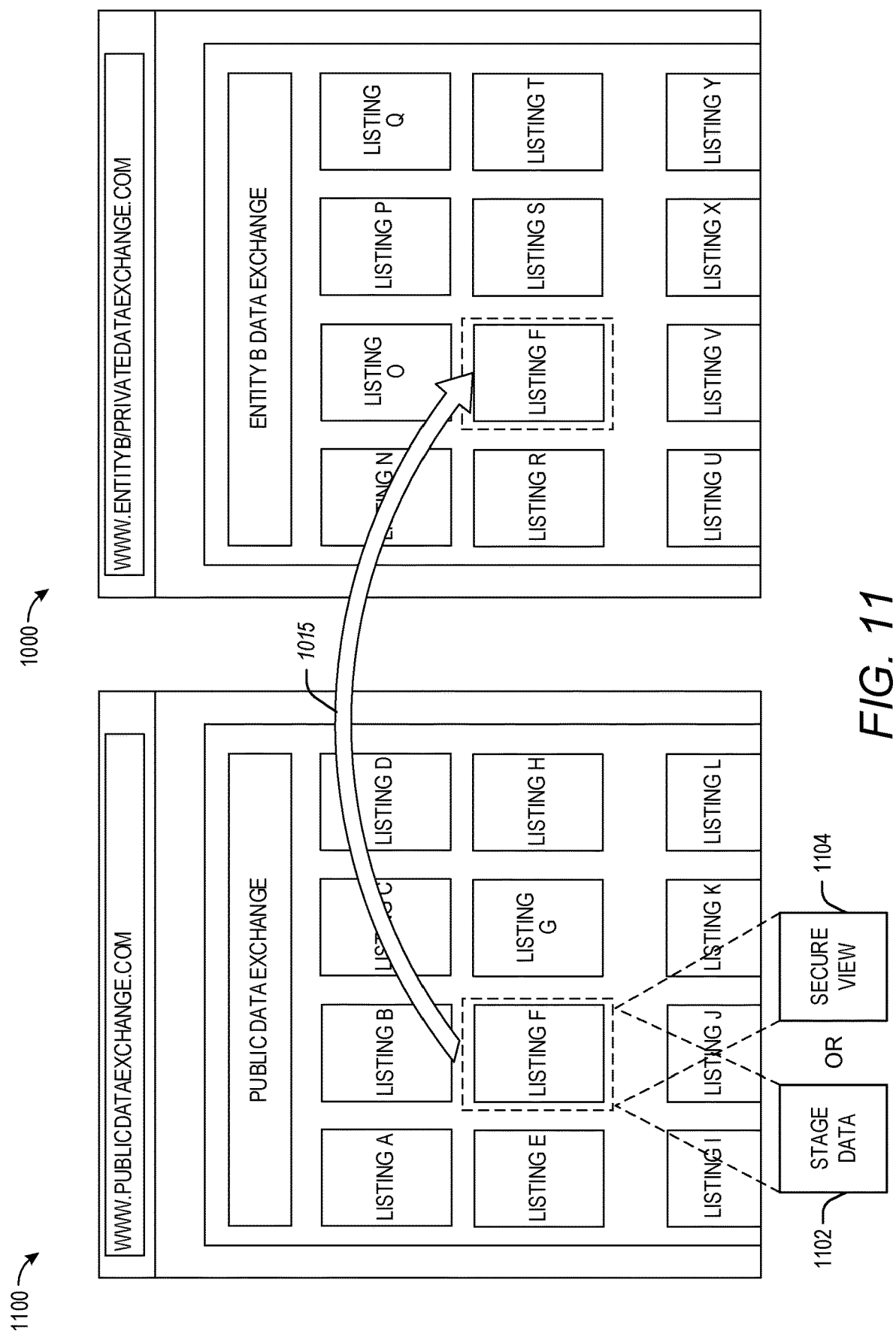
FIG. 11 is a diagram illustrating an example tunneling of a data listing between two private data exchanges, in accordance with some embodiments of the present disclosure.

The above secure view may be shared with a consumer account or published on a data exchange (e.g., as illustrated in FIG. 10 and FIG. 11). When the data consumer account receives this view, a query may be run on the secure view to get a list of files, which may trigger the secure document sharing functions discussed herein (e.g., in connection with FIG. 12 and FIG. 13).

The format of the returned scoped URL (e.g., as generated by the UDF client 412 or the secure document sharing manager 128) may be as follows:

https://<account_name>.snowflakecomputing.com/api/files/<query_id>/<encrypted_hash>.

In some embodiments, the encrypted hash in the URL may include one or more of the following: (a) User ID (e.g., the ID associated with a user or a client device originating the query); (b) a Query ID; (c) a file path; (d) a stage where the file is hosted; and (e) an expiration period of the URL.

An example scoped URL includes the following: https://my_consumer_account.snowflakecomputing.com/api/files/4d5f1200-0e1b-44b3-a269-8fc1f176d100/bXlfZGFOYWJhc2UvbXlfc2NoZW1hL215X3N0YWdlL2ZvbGRlcjEvZm9sZGVyMi9maWx1MQ.

When the data consumer associated with the consumer account clicks on the scoped URL, the data consumer will be able to access and download the files. Additional authen-

TABLE 1

|  | File URLs | Scoped URLs | Pre-signed URLs |
| --- | --- | --- | --- |
| URL format | https://my_account.snowflakecomputing.com/api/files/my_database/my_schema/my_stage/folder1/folder2/file1.jpg | https://my_account.snowflakecomputing.com/api/files/<query_id>/skfjfjwkrgntkasgtktsi | Cloud provider pre-signed urls |
| The stage is dropped or renamed | Url become invalid | Url remains valid | Url will be valid |
| The stage is recreated with the same name | Url is permanent & valid | Url remains valid | Url will be valid |
| How to get a URL? | select * from directory table will return this URL (build_stage_file_url is the function implemented and used only internally) | build_scoped_file_url returns this url. This function can be used in any query, view, function, stored proc | get_presigned_url function returns this url. |
| Lifetime | permanent | Follows expiration model of result cache (default 24 hours) | Max 1 hour (?) Account-level parameter that controls/blocks this |
| Authentication | All authentication methods supported by SQL Rest API framework | All authentication methods supported by SQL Rest API framework | N/A. It is pre-signed |
| Authorization | User must have privileges to the stage | The user must be the one who executed a query that generated this scoped URL | N/A. It is pre-signed |
| URL encrypted? | No | Yes | No | tication may be performed by the secure document sharing manager 128 before allowing access to the file.

Delete File Command and API

Users may delete files stored in an internal stage using either an SQL command or a REST API.

Delete SQL Command

To delete a file from an internal stage, the Delete SQL command may be used. Example: rm@file_stage/folder1/folder2/file1.jpg.

Delete Rest API

The Delete API may also be used to delete a file from a stage.

Example: DELETE for https://my_account.snowflake-computing.com/files/my_database/my_schema/my_stage/folder1/folder2/file1.jpg. The above Delete command may be used to perform the following: (a) Validate if the user's role has WRITE privileges for the internal stage; (b) Validate if the user's role has DELETE privileges for the file in the stage; and (c) Delete the actual file from the corresponding storage. If the previous step (b) succeeds but step (c) fails, cleanup may be attempted using a background task.

Put File Command and API

In some aspects, users may put files in an internal stage using either an SQL command or a REST API.

Put SQL Command

To put a file in an internal stage, the Put SQL command may be used. Example: put file:///users/sshah/documents/files/file.jpg @file_stage/folder1/folder2/file1.jpg;

Put Rest API

A PUT REST API may be used for creating a new file into the internal stage. Example: PUT for https://my_account.snowflakecomputing.com/files/my_database/my_schema/my_stage/folder1/folder2/file1.jpg.

Request Body Contains

Object Array/Base64 Encoded String for File Content.

The above command may be used for performing the following: (a) Validate if the user's role has WRITE privileges to the internal stage; (b) Validate if the user's role has privileges to PUT file for the folder path in the internal stage; and (c) Create the actual file using the provided file contents.

List API

Along with the GET, PUT, DELETE APIs, LIST API may be used to list the files in a stage.

List SQL Command

To list files in an internal stage or external stage, the LIST SQL command may be used. Example:

ls @file_stage/folder1/folder2/; or ls @file_stage;

The above LIST operation may not need a warehouse. It will perform a remote list against the cloud provider, and return results: select*from table(list files(@file_stage, '/folder1/folder2/').

List Rest API

The same action can also be achieved using a LIST REST API.

Adding Custom Metadata to Files

In some embodiments, the cloud computing platform 101 may use adding object tagging for internal tables. For example, when customers store files in a data lake, tagging those files with custom metadata is one of the common scenarios. The motivation for tagging the files comes from the need to search files quickly based on certain tags.

For example, the ability to search for files with the tag 'marketing', or the ability to search for all files related to a customer. In some aspects, metadata tags may be stored in a variant column in a file catalog table.

In some embodiments, the secure document sharing manager 128 may determine whether or not to invoke (or trigger) secure document sharing functions (e.g., by triggering the UDF client 412 to perform the security functions 413) based on analysis of metadata associated with a data file (e.g., data file responsive to a query) or multiple data files of a data producer stored in an external or internal stage. For example, certain types of data files (e.g., unstructured data files containing a keyword or other metadata) can be selected for processing using the disclosed secure document sharing techniques based on metadata analysis.

Figure 3:
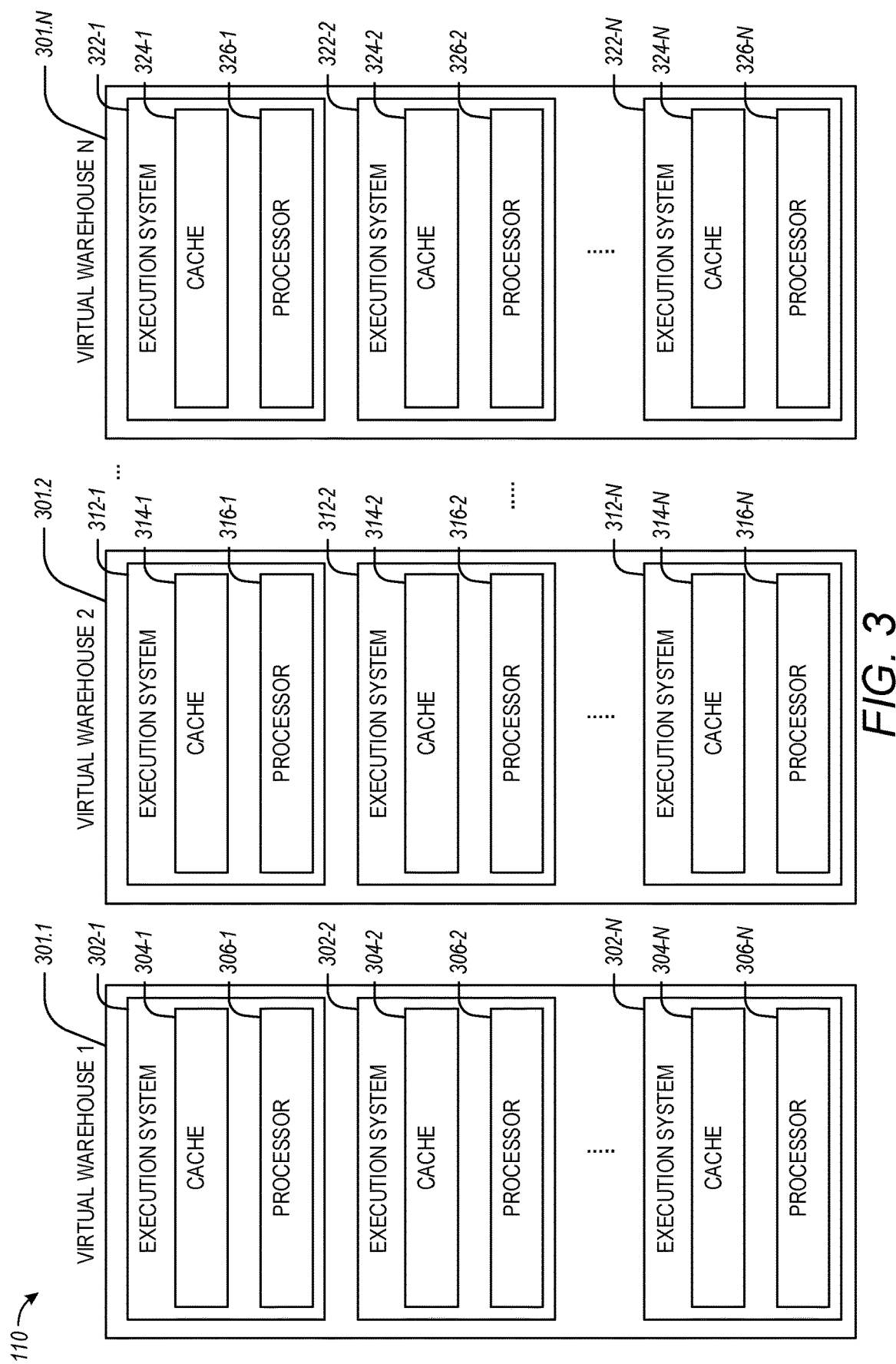
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301.1), virtual warehouse 2 (or 301.2), and virtual warehouse N (or 301.N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes is shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
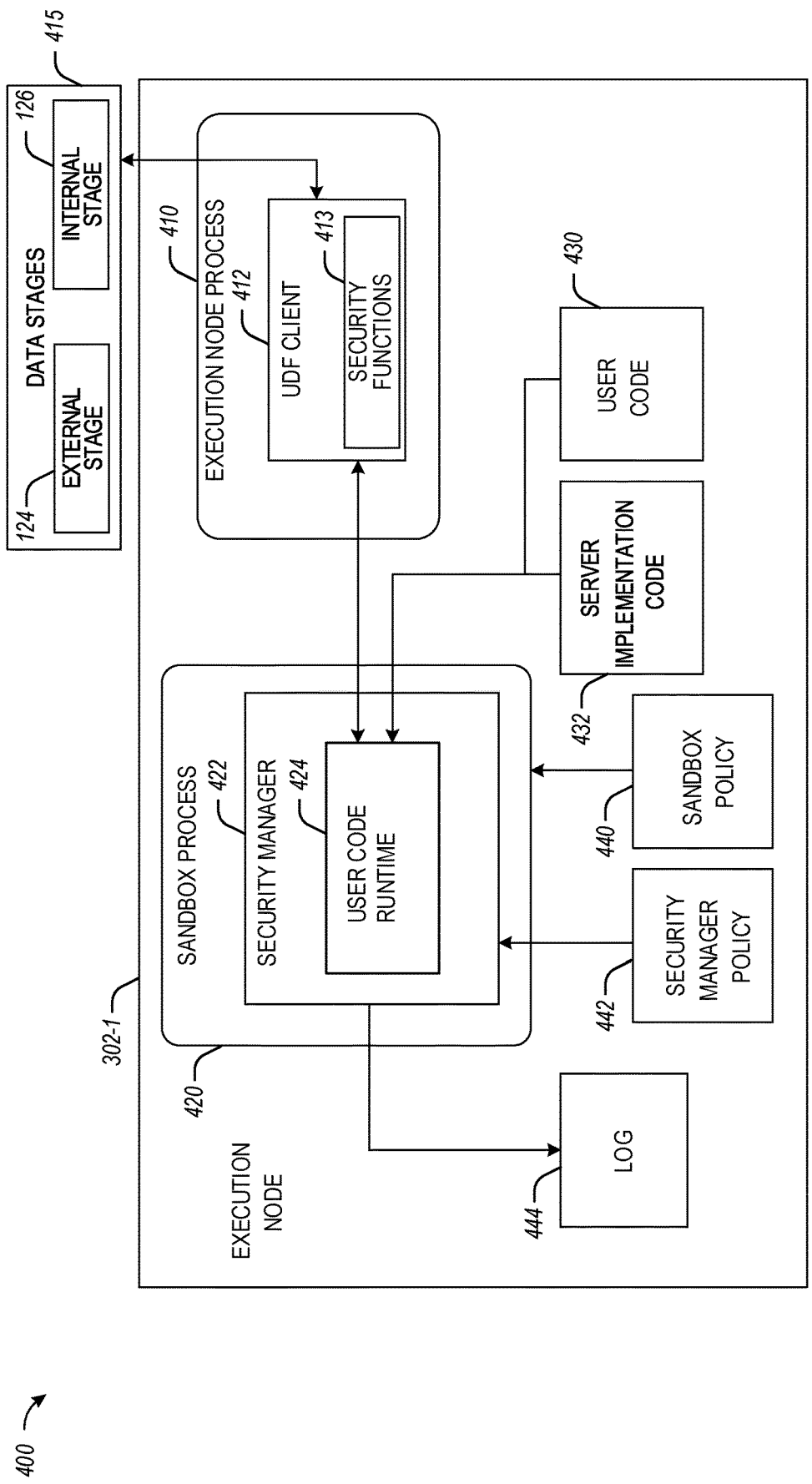
FIG. 4 is a computing environment conceptually illustrating an example software architecture executing a user-defined function (UDF) by a process running on a given execution node of the execution platform, in accordance with some embodiments of the present disclosure.

FIG. 4 is a computing environment 400 conceptually illustrating an example software architecture executing a user-defined function (UDF) by a process running on a given execution node of the execution platform 110, in accordance with some embodiments of the present disclosure.

In computer security, a sandbox (e.g., sandbox environment) is a security mechanism for separating running programs, usually to mitigate system failures or software vulnerabilities from spreading. A sandbox can be used to execute untested or untrusted programs or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system, or read from input devices can be disallowed or restricted.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF Client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve the security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server that is responsible for receiving requests from the execution node process 410, assigning worker threads to execute user code, and returning the results, among other types of server tasks.

In an implementation, an operation from a UDF (e.g., JAVA-based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in log 444 for review and retrieval. In an embodiment, the log 444 can be stored locally in memory at the execution node 302-1, or a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

In an example embodiment, the UDF client 412 is configured to perform security functions 413 in connection with the secure document sharing techniques discussed herein. More specifically, the secure document sharing manager 128 communicates with the security manager 422 and triggers the UDF client 412 to perform one or more of the security functions 413 on data stored in data stages 415. For example, security functions 413 may include performing watermarking or adding password protection (e.g., read, write, edit) password protection on data files stored in external stage 124 or internal stage 126.

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442 and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is lightweight in comparison to the execution node process 410 and is optimized (e.g., closely coupled to security mechanisms of a given operating system kernel) to process a database query securely within the sandbox environment.

In an embodiment, the sandbox process 420 can utilize a virtual network connection to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
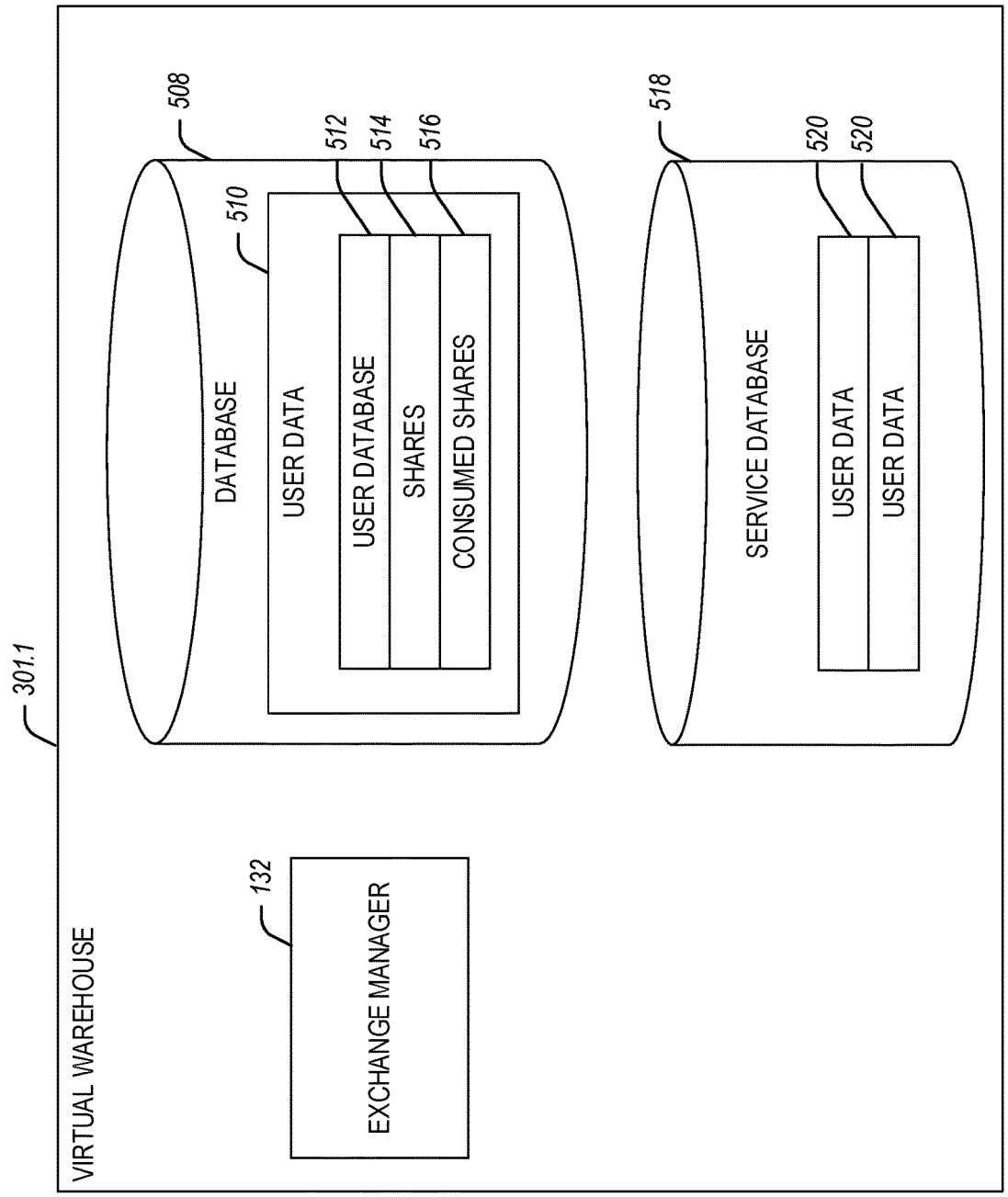
FIG. 5 is a block diagram illustrating an example virtual warehouse, in accordance with some embodiments of the present disclosure.

FIG. 5 is a block diagram illustrating an example virtual warehouse 301.1, in accordance with some embodiments of the present disclosure. The exchange manager 132 may facilitate the sharing of data between data providers and data consumers, using, for example, a private data exchange. For example, cloud computing service 103 may manage the storage and access of a database 508. The database 508 may include various instances of user data 510 for different users, e.g. different enterprises or individuals. The user data may include a user database 512 of data stored and accessed by that user. The user database 512 may be subject to access controls such that only the owner of the data is allowed to change and access the database 512 upon authenticating with the cloud computing service 103. For example, data may be encrypted such that it can only be decrypted using decryption information possessed by the owner of the data. Using the exchange manager 132, specific data from a user database 512 that is subject to these access controls may be shared with other users in a controlled manner according to the methods disclosed herein. In particular, a user may specify shares 514 that may be shared in public or private data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 103 of cloud computing platform 101.

Sharing data may be performed when a data provider creates a share of a database in the data provider's account and grants access to particular objects (e.g., tables, secure views, and secure user-defined functions (UDFs)). Then a read-only database may be created using the information provided in the share. Access to this database may be controlled by the data provider.

Shared data may then be used to process SQL queries, possibly including joins, aggregations, or other analyses. In some instances, a data provider may define a share such that "secure joins" are permitted to be performed concerning the shared data. A secure join may be performed such that analysis may be performed concerning shared data but the actual shared data is not accessible by the data consumer (e.g., recipient of the share).

Client devices 114, such as laptop computers, desktop computers, mobile phones, tablet computers, cloud-hosted computers, cloud-hosted serverless processes, or other computing processes or devices may be used to access the virtual warehouse 301.1 or cloud services of the compute service manager 108 by way of a network 105, such as the Internet or a private network.

In the description below, actions are ascribed to users, particularly consumers and providers. Such actions shall be understood to be performed concerning client devices 114 operated by such users. For example, notification to a user may be understood to be a notification transmitted to client devices 114, input or instruction from a user may be understood to be received by way of the client devices 114, and interaction with an interface by a user shall be understood to be interaction with the interface on the client devices 114. In addition, database operations (joining, aggregating, analysis, etc.) ascribed to a user (consumer or provider) shall be understood to include performing such actions by the cloud computing service 103 in response to an instruction from that user.

Figure 6:
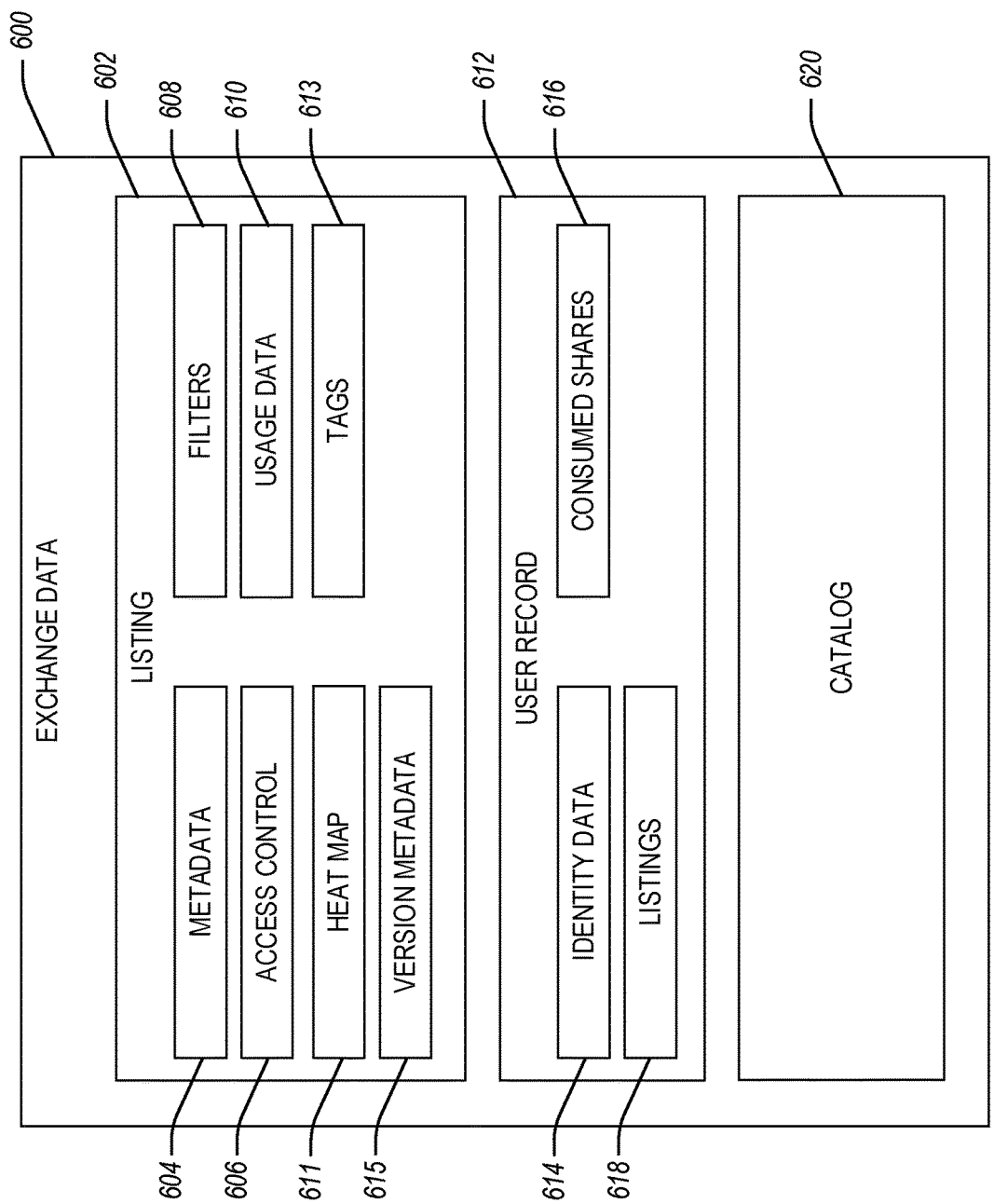
FIG. 6 is a schematic block diagram of data that may be used to implement a public or private data exchange in accordance with an embodiment of the present invention, in accordance with some embodiments of the present disclosure.

FIG. 6 is a schematic block diagram of data that may be used to implement a public or private data exchange in accordance with an embodiment of the present invention, in accordance with some embodiments of the present disclosure. The exchange manager 132 may operate concerning some or all of the illustrated exchange data 600, which may be stored on the platform executing the exchange manager 132 (e.g., the cloud computing platform 101) or at some other location. The exchange data 600 may include a plurality of listings 602 describing data that is shared by a first user ("the provider"). The listings 602 may be listings in a private data exchange or a public data exchange. The access controls, management, and governance of the listings may be similar for both public data exchange and private data exchange. A listing 602 may include metadata 604 describing the shared data. The metadata 604 may include some or all of the following information: an identifier of the sharer of the shared data, a URL associated with the sharer, a name of the share, a name of tables, a category to which the shared data belongs, an update frequency of the shared data, a catalog of the tables, several columns and several rows in each table, as well as name and descriptions of the columns. The metadata 604 may also include examples to aid a user in using the data. Such examples may include sample tables or views that include a sample of rows and columns of an example table, example queries that may be run against the tables and/or possibly the results thereof, example views of an example table, example visualizations (e.g., graphs, dashboards) based on a table's data. Other information included in the metadata 604 may be metadata for use by business intelligence tools, text description of data contained in the table, keywords associated with the table to facilitate searching, bloom filters or other full-text indices of the data in certain columns, a link (e.g., URL) to documentation related to the shared data, and a refresh interval indicating how frequently the shared data is updated (or an indication that the shared data is updated continuously) along with the date the data was last updated.

Listing 602 may include access controls 606, which may be configurable to any suitable access configuration. For example, access controls 606 may indicate that the shared data is available to any member of the private exchange without restriction (an "any share" as used elsewhere herein). The access controls 606 may specify a class of users (members of a particular group or organization) that are allowed to access the data and/or see the listing. The access controls 606 may specify that a "point-to-point" share in which users may request access but are only allowed access upon approval of the provider. The access controls 606 may specify a set of user identifiers of users that are excluded from being able to access the data referenced by listing 602.

Note that some listings 602 may be discoverable by users without further authentication or access permissions whereas actual accesses are only permitted after a subsequent authentication step. The access controls 606 may specify that a listing 602 is only discoverable by specific users or classes of users.

Note also that a default function for listings 602 is that the data referenced by the share is not exportable or copyable by the consumer. Alternatively, access controls 606 may specify that this operation is not permitted. For example, access controls 606 may specify that secure operations (secure joins and secure functions as discussed below) may be performed with respect to the shared data such that viewing and exporting of the shared data is not permitted.

In some embodiments, once a user is authenticated with respect to a listing 602, a reference to that user (e.g., user identifier of the user's account with the virtual warehouse 301.1) is added to the access controls 606 such that the user will subsequently be able to access the data referenced by the listing 602 without further authentication.

The listing 602 may define one or more filters 608. For example, the filters 608 may define specific user identifiers 614 of users that may view references to the listing 602 when browsing the catalog 620. The filters 608 may define a class of users (users of a certain profession, users associated with a particular company or organization, users within a particular geographical area or country) that may view references to the listing 602 when browsing the catalog 620.

In this manner, a private exchange may be implemented by the exchange manager 132 using the same components. In some embodiments, an excluded user that is excluded from accessing a listing 602, i.e. adding the listing 602 to the consumed shares 616 of the excluded user, may still be permitted to view a representation of the listing when browsing the catalog 620 and may further be permitted to request access to the listing 602 as discussed below. Requests to access a listing by such excluded users and other users may be listed in an interface presented to the provider of the listing 602. The provider of listing 602 may then view the demand for access to the listing and choose to expand the filters 608 to permit access to excluded users or classes of excluded users (e.g., users in excluded geographic regions or countries).

Filters 608 may further define what data may be viewed by a user. In particular, filters 608 may indicate that a user that selects a listing 602 to add to the consumed shares 616 of the user is permitted to access the data referenced by the listing but only a filtered version that only includes data associated with the user identifier 614 of that user, associated with that user's organization, or specific to some other classification of the user. In some embodiments, a private exchange is by invitation: users invited by a provider to view listings 602 of a private exchange are enabled to do by the exchange manager 132 upon communicating acceptance of an invitation received from the provider.

In some embodiments, a listing 602 may be addressed to a single user. Accordingly, a reference to listing 602 may be added to a set of "pending shares" that is viewable by the user. The listing 602 may then be added to a group of shares of the user upon the user communicating approval to the exchange manager 132.

The listing 602 may further include usage data 610. For example, cloud computing service 103 may implement a credit system in which credits are purchased by a user and are consumed each time a user runs a query, stores data, or uses other services implemented by the cloud computing service 103. Accordingly, usage data 610 may record the number of credits consumed by accessing the shared data. Usage data 610 may include other data such as a number of queries, a number of aggregations of each type of a plurality of types performed against the shared data, or other usage statistics. In some embodiments, usage data for a listing 602 or multiple listings 602 of a user is provided to the user in the form of a shared database, i.e. a reference to a database including the usage data is added by the exchange manager 132 to the consumed shares of the user.

The listing 602 may also include a heat map 611, which may represent the geographical locations in which users have clicked on that particular listing. The cloud computing service 103 may use the heat map to make replication decisions or other decisions with the listing. For example, private data exchange may display a listing that contains weather data for Georgia, USA. The heat map 611 may indicate that many users in California are selecting the listing to learn more about the weather in Georgia. Given this information, the cloud computing service 103 may replicate the listing and make it available in a database whose servers are physically located in the western United States, so that consumers in California may have access to the data. In some embodiments, an entity may store its data on servers located in the western United States. A particular listing may be very popular with consumers. The cloud computing service 103 may replicate that data and store it in servers located in the eastern United States, so that consumers in the Midwest and on the East Coast may also have access to that data.

The listing 602 may also include one or more tags 613. Tags 613 may facilitate the simpler sharing of data contained in one or more listings. As an example, a large company may have a human resources (HR) listing containing HR data for its internal employees on private data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 602 may also include version metadata 615. Version metadata 615 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 103 may track version updates using version metadata 615. The cloud computing service 103 may ensure that each data consumer accesses the same version of the data until they accept an updated version that will not interfere with the current processing of the data set.

The exchange data 600 may further include user records 612. The user record 612 may include a user identifier 614 identifying the user associated with the user record 612, e.g. an identifier (e.g., warehouse identifier) of a user having user data 520 in the service database 518 and managed by the virtual warehouse 301.1.

The user record 612 may list shares associated with the user, e.g., reference listings 618 created by the user. The user record 612 may list shares 616 consumed by the user, e.g. reference listings 602 created by another user and that have been associated with the account of the user according to the methods described herein. For example, a listing 602 may have an identifier that will be used to reference it in the shares or consumed shares of a user record 612.

The exchange data 600 may further include a catalog 620. Catalog 620 may include a listing of all available listings 602 and may include an index of data from the metadata 604 to facilitate browsing and searching according to the methods described herein. In some embodiments, listings 602 are stored in the catalog in the form of JavaScript Object Notation (JSON) objects.

Note that where there a multiple instances of the virtual warehouse 301.1 on different cloud computing platforms, catalog 620 of one instance of the virtual warehouse 301.1 may store listings or references to listings from other instances on one or more other cloud computing platforms 101. Accordingly, each listing 602 may be globally unique (e.g., be assigned a globally unique identifier across all of the instances of the virtual warehouse 301.1). For example, the instances of the virtual warehouses 301.1 may synchronize their copies of the catalog 620 such that each copy indicates the listings 602 available from all instances of the virtual warehouse 301.1. In some instances, a provider of a listing 602 may specify that it is to be available only on specified on or more computing platforms 101.

In some embodiments, catalog 620 is made available on the Internet such that it is searchable by a search engine such as BING or GOOGLE. The catalog may be subject to a search engine optimization (SEO) algorithm to promote its visibility. Potential consumers may therefore browse catalog 620 from any web browser. The exchange manager 132 may expose uniform resource locators (URLs) linked to each listing 602. This web page underlying each URL may be searchable can be shared outside of any interface implemented by the exchange manager 132. For example, the provider of a listing 602 may publish the URLs for its listings 602 to promote usage of its listing 602 and its brand.

Figure 7:
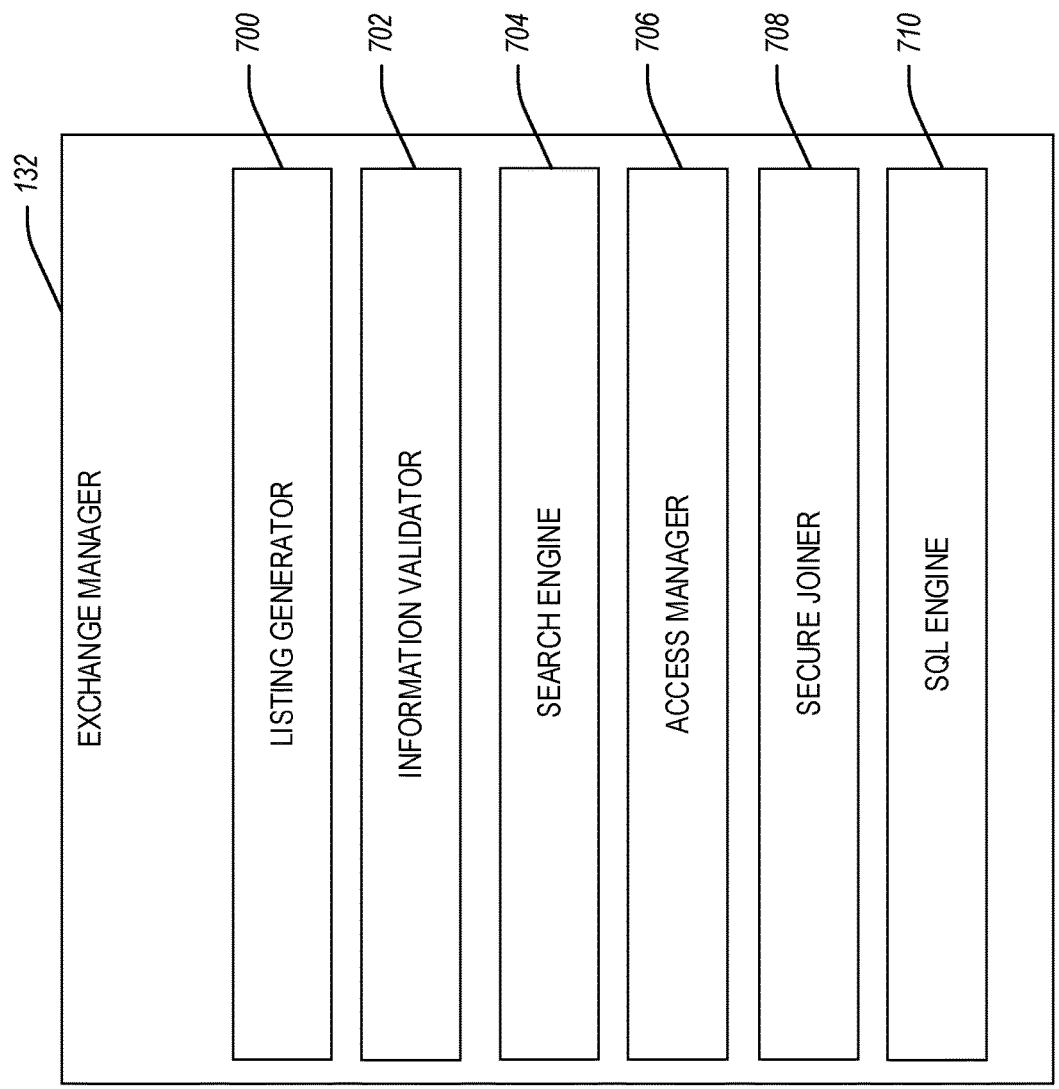
FIG. 7 is a schematic block diagram of components for implementing a data exchange in accordance with an embodiment of the present invention, in accordance with some embodiments of the present disclosure.

FIG. 7 is a schematic block diagram of components for implementing a data exchange in accordance with an embodiment of the present invention, in accordance with some embodiments of the present disclosure. FIG. 7 illustrates various components 700-710 that may be included in the exchange manager 132. A creation module (or listing generator) 700 may provide an interface for creating listings 602. For example, a web page interface enables a user on one or more client devices 114 to select data, e.g. a specific table in user data 520 of the user, for sharing and entering values defining some or all of the metadata 604, access controls 606, and filters 608. In some embodiments, creation may be performed by a user by way of SQL commands in an SQL interpreter executing on the cloud computing platform 101 and accessed by way of a webpage interface on client devices 114.

A validation module (or information validator) 702 may validate information provided by a provider when attempting to create a listing 602. Note that in some embodiments the actions ascribed to the validation module 702 may be performed by a human reviewing the information provided by the provider. In other embodiments, these actions are performed automatically. The validation module 702 may perform, or facilitate performing by a human operator of various functions. These functions may include verifying that the metadata 604 is consistent with the shared data to which it references, verifying that the shared data referenced by metadata 604 is not pirated data, personal identification information (PII), personal health information (PHI), or other data for which sharing is undesirable or illegal. The validation module 702 may also facilitate the verification that the data has been updated within a threshold period (e.g., within the last twenty-four hours). The validation module 702 may also facilitate verifying that the data is not static or not available from other static public sources. The validation module 702 may also facilitate verifying that the data is more than merely a sample (e.g., that the data is sufficiently complete to be useful). For example, geographically limited data may be undesirable whereas aggregation of data that is not otherwise limited may still be of use.

The exchange manager 132 may include a search module (or search engine) 704. The search module 704 may implement a webpage interface that is accessible by a user on one or more client devices 114 to invoke searches for search strings with respect to the metadata in the catalog 620, receive responses to searches, and select references to listings 602 in search results for adding to the consumed shares 516 of the user record 612 of the user performing the search. In some embodiments, searches may be performed by a user by way of SQL commands in an SQL interpreter executing on the cloud computing platform 101 and accessed by way of a webpage interface on client devices 114. For example, searching for shares may be performed by way of SQL queries against catalog 620 within the SQL engine 710 discussed below.

The search module (or search engine) 704 may further implement a recommendation algorithm. For example, the recommendation algorithm could recommend another listing 602 for a user based on other listings in the user's consumed shares 516 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage by the user's analysis (different geographic area, related technical field, etc.).

The exchange manager 132 may include an access management module (or access manager) 706. As described above, a user may add a listing 602. This may require authentication with respect to the provider of listing 602. Once a listing 602 is added to the consumed shares 516 of the user record 612 of a user, the user may be either (a) required to authenticate each time the data referenced by the listing 602 is accessed or (b) be automatically authenticated and allowed to access the data once the listing 602 is added. The access management module 706 may manage automatic authentication for subsequent access of data in the consumed shares 516 of a user to provide seamless access of the shared data as if it was part of the user data 520 of that user. To that end, the access management module 706 may use access controls 606 of the listing 602, certificates, tokens, or other authentication material to authenticate the user when performing accesses to shared data.

The exchange manager 132 may include a joining module (or secure joiner) 708. The joining module 708 manages the integration of shared data referenced by consumed shares 516 of a user with one another, i.e. shared data from different providers, and with a user database 512 of data owned by the user. In particular, the joining module 708 may manage the execution of queries and other computation functions with respect to these various sources of data such that their access is transparent to the user. The joining module 708 may further manage the access of data to enforce restrictions on shared data, e.g. such that analysis may be performed and the results of the analysis displayed without exposing the underlying data to the consumer of the data where this restriction is indicated by the access control 606 of a listing 602.

The exchange manager 132 may further include a standard query language (SQL) engine 710 that is programmed to receive queries from a user and execute the query with respect to data referenced by the query, which may include consumed shares 516 of the user and the user data 510 owned by the user. The SQL engine 710 may perform any query processing functionality known in the art. The SQL engine 710 may additionally or include any other database management tool or data analysis tool known in the art. The SQL engine 710 may define a webpage interface executing on the cloud computing platform 101 through which SQL queries are input and responses to SQL queries are presented.

Figure 8:
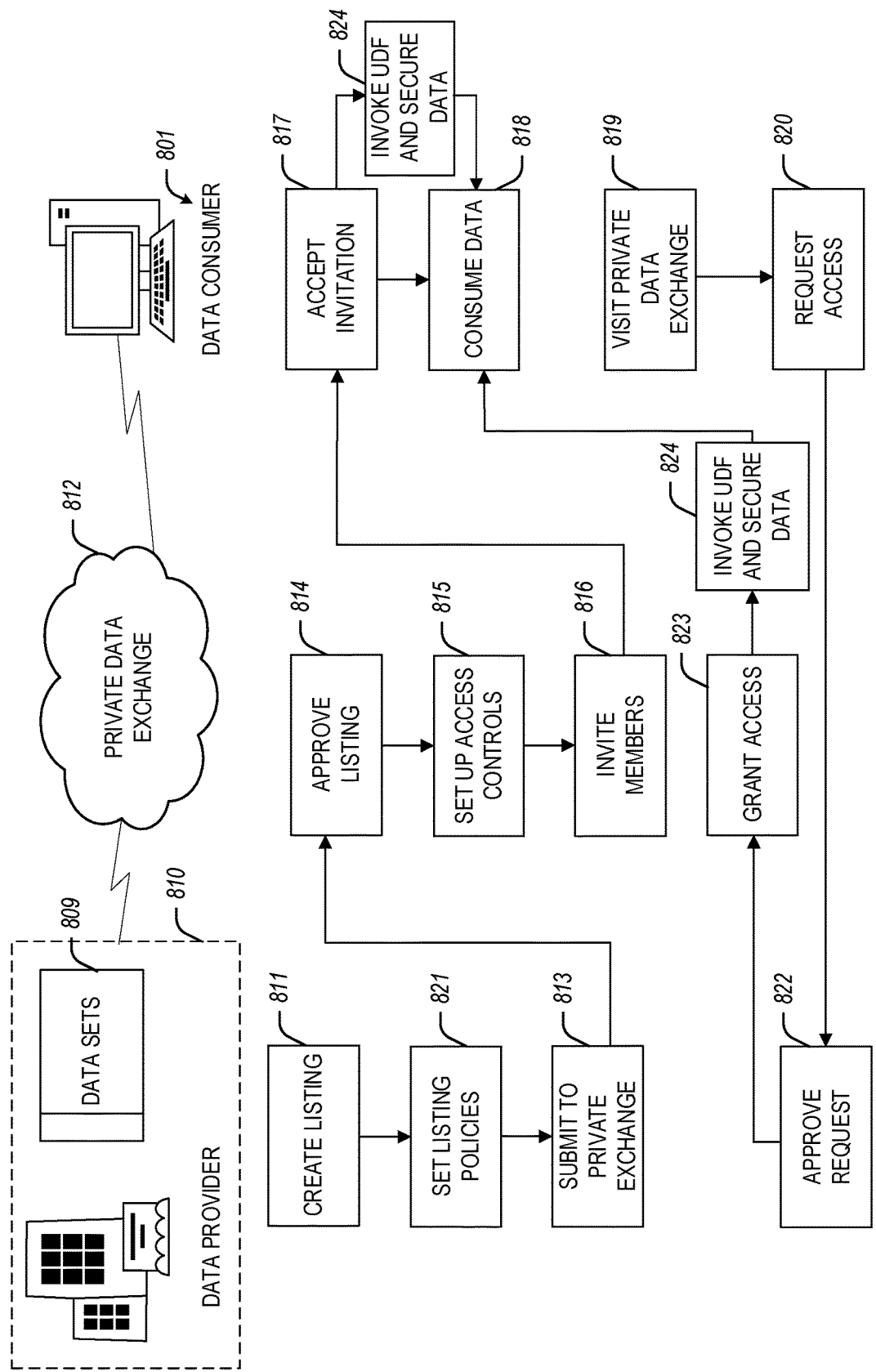
FIG. 8 is a block diagram illustrating a network environment in which a data provider may share data via a cloud computing service, in accordance with some embodiments of the present disclosure.

FIG. 8 is a block diagram illustrating a network environment in which a data provider may share data via a cloud computing service. A data provider 810 may upload one or more data sets 809 in cloud storage using a cloud computing service 103. These data sets may then become viewable by one or more data consumers. The data provider 810 may be able to control, monitor, and increase the security of its data using the cloud computing service 103 using the methods and systems discussed herein. In particular embodiments, the data provider 810 may implement private data exchange with secure document sharing on its online domain using the functionality, methods, and systems provided by cloud computing service 103 (e.g., using functions performed by the secure document sharing manager 128 and the UDF client 130). Data providers 810 may be any provider of data, such as retail companies, government agencies, polling agencies, non-profit organizations, etc. The data consumers (e.g., data consumers using client devices 114) may be internal to the data provider 810 or external to the data provider 810. A data consumer that is internal to the data provider may be an employee of the data provider. The data provider may be a bike-share company, which provides bicycles for a daily, monthly, annual, or trip-based fee. The bike-share company may gather data about its users, such as basic demographic information as well as ride information, including date of ride, time of ride, and duration of the ride. This information may be available to employees of the bike-share company via the cloud computing service 103.

The interaction between a data provider 810, private data exchange 812 (as implemented by cloud computing service 103), and a data consumer 801 may be as follows. The data provider may create one or more listings 811 using data sets 809. The listings may be for any suitable data. For example, a consumer data company may create a listing called "video streaming" that contains data related to the video streaming habits of a large number of users. The data provider may set listing policies (at operation 821) related to who may view listing 811, who may access the data in listing 811, or any other suitable policy. Such listing policies are discussed above concerning FIG. 6.

The data provider 810 may then submit to the private exchange 812 at operation 813. The private data exchange 812 may be embedded inside a web domain of the data provider 810. For example, if the web domain of the consumer data company is www.entityA.com, the private data exchange may be found at www.entityA.com/private-dataexchange. The private data exchange 812 may receive the listing and approve it at operation 814 if the listing complies with one or more rules as determined by the cloud computing service 103. The private data exchange 812 may then set up access controls at 815 at least in part according to the listing policies that were set in operation 821. The private data exchange 812 may then invite members at operation 816. The members may be data consumers 801. The data consumers 801 may accept the invitation at operation 817. Upon accepting the invitation, a notification may be provided to the secure document sharing manager 128, and the secure document sharing manager 128 may invoke the UDF client and secure the data for sharing at operation 824. For example, the UDF client 130 performs security functions 413 in connection with securing documents associated with the accepted invitation at operation 817 for subsequent sharing. The data consumer 801 may then begin consuming the data (e.g., the secured or modified data file as a result of applying the security functions by the UDF client 130) at operation 818. The type of data consumption may depend on the access controls that were established at operation 815. For example, the data consumer may be able to read the data only or share the data. As another example, a data consumer may be able to do any combination of the above read or share operations on the data, subject to the access controls. In general, data sharing does not involve altering shared data.

In some embodiments, a data consumer 801 may independently access the private data exchange 812 (e.g., at operation 819), either by directly navigating to the private data exchange 812 in a browser, or by clicking on an advertisement for the private data exchange 812, or by any other suitable mechanism. Private data exchange may also be rendered via custom or other code by accessing listing and other information via an API. If the data consumer 801 wishes to access the data within a listing and the listing is not already universally available or the data consumer 801 does not already have access, the data consumer 801 may need to request access at operation 820. The data provider may approve or deny the request at 822. If approved, the private data exchange may grant access to the listing at 823. Before the data is accessed, secure data sharing functions are performed at operation 824 to secure the data for sharing. The user may then begin consuming the data (at operation 818) as discussed above.

In particular embodiments, one or more data exchange administrator accounts may be designated by the cloud computing service 103. The data exchange administrator may manage members of the private data exchange by designating members as data providers 810 or data consumers 801. The data exchange administrator may be able to control listing visibility by selecting which members can see a given listing. The data exchange administrator may also have other functions such as approving listings before they are published on the private data exchange, track usage of each of the listings, or any other suitable administrative function. In some embodiments, the data provider and the data exchange administrator are part of the same entity; in some embodiments, they are separate entities. The provider may create listings, may test sample queries on the data underlying a listing, may set listing access, grant access to listing requests, and track usage of each of the listings and the data underlying the listings. A data consumer 801 may visit a private data exchange and browse visible listings which may appear as tiles. To consume the data underlying a listing, the consumer may either immediately access the data or may request access to the data.

Figure 9:
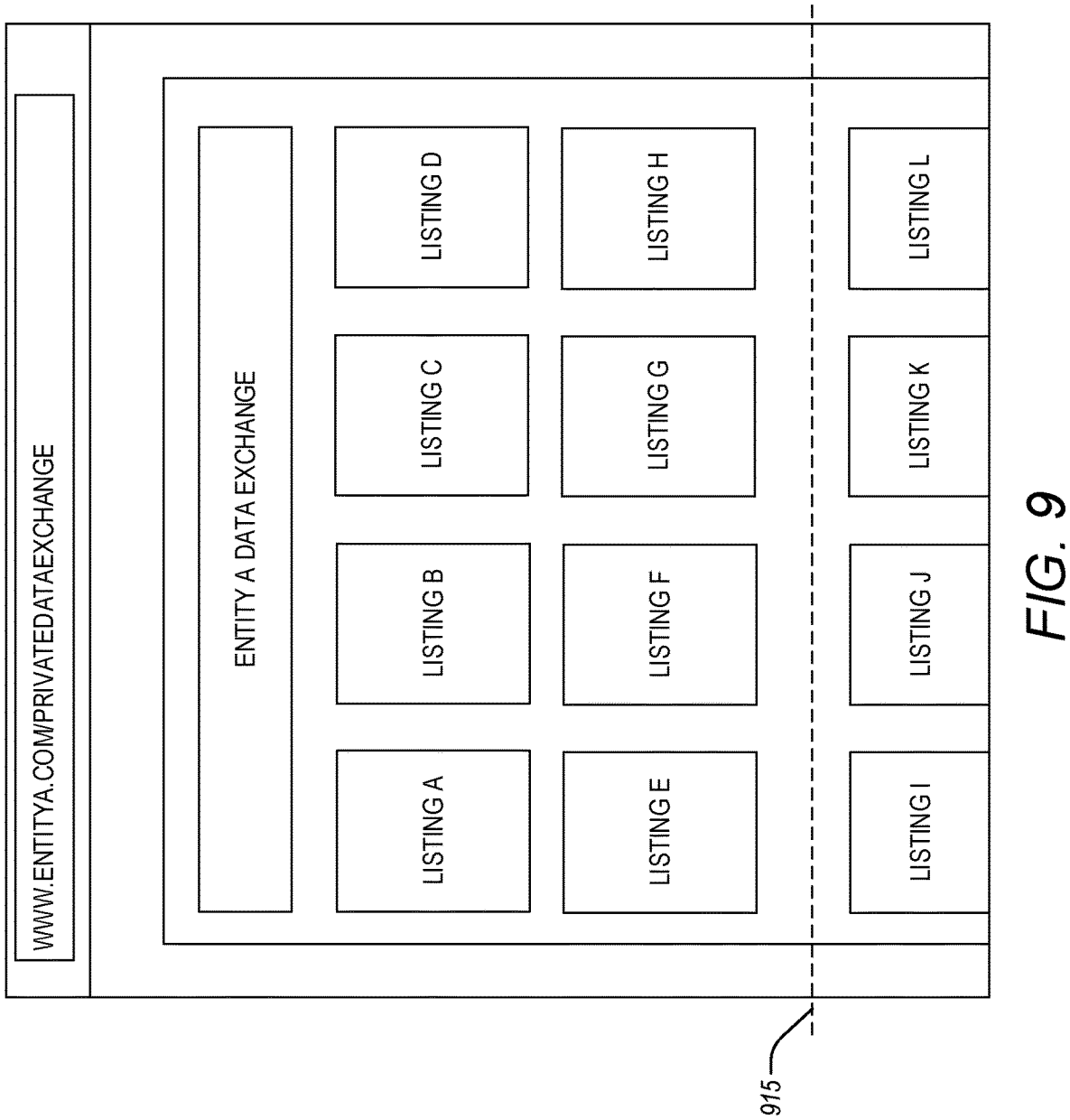
FIG. 9 is an example of private data exchange in accordance with an embodiment of the present invention, in accordance with some embodiments of the present disclosure.

FIG. 9 is an example of private data exchange 900 in accordance with an embodiment of the present invention. Private data exchange 900 may be what a data consumer sees when she navigates to the private data exchange on the web. For example, the data consumer may enter www.entityA.com/privatedataexchange in her browser. As discussed herein, "Entity A Data Exchange" may be a private data exchange that is facilitated by the cloud computing service 103 and is embedded into Entity A's web domain or an application, or maybe accessed via an API. Private data exchange 900 may include several listings for different data sets, for example, listings A-L. The listing A-L may also be referred to herein as a data catalog, which may allow visitors to the private data exchange to view all the available listings in the private data exchange. These listings may be placed by an administrator internal to Entity A. Providing a data catalog in this manner may serve to combine the benefits of crowdsourced content, data quality, and the right level of centralized control and coordination that can overcome the challenges that have slowed the adoption of other approaches to enterprise data cataloging (e.g., indexing and crawling systems). It allows users across an enterprise to contribute data, use data from other groups, and join data together to create enriched data products, for both internal uses as well as potentially for external monetization.

As an example and not by way of limitation, Entity A may be a consumer data company that has collected and analyzed the consuming habits of millions of individuals in several different categories. Their data sets may include data in the following categories: online shopping, video streaming, electricity consumption, automobile usage, internet usage, clothing purchases, mobile application purchases, club memberships, and online subscription services. Each of these data sets may correspond to different listings. For example, Listing A maybe for online shopping data, Listing B may be for video streaming data, Listing C may be for electricity consumption data, and so on. Note that the data may be anonymized so that individual identities are not revealed. The listings located below line 915 may correspond to third-party listings that entity A may allow on its private data exchange. Such listings may be generated by other data providers and may be subject to approval by Entity A before being added to the private data exchange 900. A data consumer may click on and view any of the listings subject to various access controls and policies.

In particular embodiments, a data provider may invite members to access its private data exchange, as discussed with reference to FIG. 8. One class of members may be the physical and digital supply chain suppliers of the data provider. For example, a data provider may share data with suppliers on its inventory levels or consumption of things provided by the suppliers, so they can better meet the needs of the data provider. In addition, digital data providers may provide data directly into its private data exchange, to make it immediately usable and joinable to the internal enterprise data, saving costs for both parties on transmitting, storing, and loading the data.

Some companies such as hedge funds and marketing agencies bring in data from many external sources. Some hedge funds evaluate hundreds of potential data sets per year. Private data exchange may be used to not only connect with data that has already been purchased but can also be used to evaluate new data assets. For example, a hedge fund could have potential data suppliers list their data on their private exchange, and the fund could explore and "shop" for data in a private data store where they are the only customer. Such an internal data store could also "tunnel" in data assets from a public Data Exchange (e.g., the SNOWFLAKE public Data Exchange), as discussed with reference to FIG. 11.

FIG. 10 is a diagram illustrating an example secure view of shared data from private data exchange. When a data consumer 1020 wishes to access data in a listing (e.g., Listing H), the cloud computing service 103 may facilitate access via a secure view of shared data 1010. The secure view of shared data 1010 may include metadata 1014 that includes the metadata and access controls discussed herein with reference to FIG. 6. This may allow data providers to share data without exposing the underlying tables or internal details. This makes the data more private and secure. With a secure view of shared data 1010, the view definition and details are only visible to authorized users.

In some embodiments, one or more of the listings, such as Listing D, may include stage data 1019 and corresponding metadata 1017. Stage data may include data from an internal or external stage of a provider. In some embodiments, access to the stage data 1019 within the data exchange may be protected using secure data sharing techniques discussed herein.

In private data exchange, data may be shared both within the same entity and between different entities. Additionally, the data sharing may be one-way, two-way, or multi-way. In one embodiment, his can lead to up to five main use-cases for sharing data: two-way inter-entity, two-way intra-entity, one-way inter-entity, one-way intra-entity, and multi-way multi-entity. An example of two-way inter-entity data sharing may be data sharing from portfolio companies to a parent company and between portfolio companies. An example of two-way intra-entity data sharing may be data sharing from the headquarters of a large company to the different business units within that company, and also data sharing from the business units to headquarters. An example of one-way inter-entity data sharing may be a large data provider (e.g., a national weather service) that shares data with lots of different entities, but does not receive data from those entities. An example of a one-way intra-entity may be a large company that provides data to its respective business units but does not receive data from those business units. In particular embodiments, data may be shared as "point-to-point shares" of specific data, or as "any-shares." A point-to-point share of specific data may include a private data exchange share between a parent company and specific portfolio companies. An any-share may include a private data exchange share from a parent company to a broad group of data consumers on a public or within a private exchange.

In particular embodiments, the cloud computing service 103 may generate a private data exchange for an entity who is the owner of the data to be shared on the private data exchange. The cloud computing service 103 may designate one or more administrators of the private data exchange. These administrators may have control over the access rights of the private data exchange with regard to other users. For example, an administrator may be able to add another user account to the private data exchange and designate that account as a data provider, data consumer, exchange administrator, or a combination of these.

In particular embodiments, the exchange administrator may control viewing and access rights to the private data exchange. Viewing rights may include a list of entities that may view the listing in the private data exchange. Access rights may include a list of entities that may access the data after selecting a particular listing. For example, a company may publish private data exchange 900 and may include several listings, Listing A through Listing L. Each of these listings may include its viewing and access rights. For example, Listing A may include a first list of entities that have rights to view the listing on the private data exchange 900 and a second list of entities that have rights to access the listing. Viewing a listing may simply be to see that the listing exists on the private data exchange. Accessing a listing may be to select the listing and access the underlying data for that listing. Access may include both viewing the underlying data, manipulating that data, or both. Controlling viewing rights may be useful for data providers who do not want some users to even know that a certain listing exists on the private data exchange. Thus, when a user who does not have viewing rights to a particular listing visits the private data exchange, that user will not even see the listing on the exchange.

In particular embodiments, the above-discussed viewing and access rights may be provisioned via an application program interface (API). The exchange catalog may be queried and updated via the API. This may allow a data provider to show listings on its application or website to anyone who visits. When a user wants to access or request access to data, the user may then create an account with the cloud computing service 103 and obtain access. In some embodiments, a URL may be called with a user requests access to data within a listing. This may allow for integration with external request approval workflows. For example, if a user makes an access request, an external request approval workflow of the data provider may be accessed and activated. The external request approval workflow may then operate normally to perform an external request approval process. In some embodiments, a listing may be unlisted, which means that the listing exists but is not visible on the data exchange. To access an unlisted listing, a consumer may input a global URL into the browser. This may require a unique URL for each listing.

When a member becomes a data provider, a provider profile may be generated that includes a logo, a description of the provider, and a URL to the provider's website. When submitting listings, a provider may do the following: select which private data exchange to publish the data in (e.g., many private exchanges may exist and the provider may need to select a subset of these exchanges, which may be one or more), and set metadata about the new listing. The metadata may include a listing title, a listing type (e.g., Standard or Personalized), a listing description, one or more usage examples (e.g., title and sample queries), a listing category, which may be input as free form text, an update frequency for the listing, a support email/URL, and a documentation link. The provider may also set access for the listing. The provider may allow the exchange admin to control the visibility of the listing, or the provider may retain that control for itself. The provider may also associate a share with a listing. For a standard share, a listing may be associated with zero or more shares. The provider may associate shares to a listing through the UI or SQL. For personalized shares, when the provider provisions a share in response to a request, the provider may associate that share with the listing. When the provider wishes to publish the listing, the listing may first need approval from the exchange admin, depending on the publishing rules of the private data exchange.

FIG. 11 is a diagram illustrating an example tunneling of a data listing between a public data exchange and a private data exchange. Alternatively, data may be tunneled between two public data exchanges or between two private data exchanges, or from one public exchange to multiple private exchanges, or any other suitable combination. In some embodiments, an entity may wish to offer a publicly listed data listing on its private data exchange. For example, Entity B may wish to include Listing F of public data exchange 1100 on its own private data exchange 1000. The data underlying Listing F may be tunneled from public data exchange 1100 to private data exchange 1000.

In particular embodiments, data may be tunneled between two private data exchanges. At times, a first data provider may wish to allow a second data provider to list data belonging to the first data provider on private data exchange of the second data provider. Tunneling of data listings may allow the two data providers to offer the same listing. As an example, Entity A and Entity B may have a business agreement to share listing F on each of their private data exchanges. Listing F may be the property of Entity A, but Entity B may have a license to offer it on its private data exchange as well. In this case, both of the listings titled "Listing F" will point to the same data set stored in cloud computing platform 101. Tunnel 1015 is a representation to illustrate that Listing F may be shared securely and easily between two or more data exchanges 1100 and 1000. No data is copied or transferred in the tunneling. Instead, each listing contains a pointer to the data referenced by Listing F as discussed herein.

In some embodiments, one or more of the listings in the public data exchange 1100, such as Listing F, may include stage data 1102 or secure view data 1104. Stage data may include data from an internal or external stage of a provider. Secure view data may be generated by the provider using internal or external stage data. In some embodiments, the stage data 1102 or the secure view data 1104 may be shared with the private data exchange 1000 via tunnel 1015. Additionally, access to the stage data 1102 and the secure view data 1104 within the private data exchange 1000 may be protected using secure data sharing techniques discussed herein (e.g., secure document sharing functions discussed herein may be performed when document access is requested by a user of the private data exchange 1000 based on selecting the stage data 1102 or the secure view data 1104).

In particular embodiments, tunnel linking may be accomplished between a private data exchange and public data exchange, or vice versa. For instance, data exchange 1100 may be public. Entity B may use a listing listed on the public data exchange 1100 on its private data exchange 1000 via tunnel 1015. In some embodiments, a data listing may be tunneled from one data exchange to another data exchange and then the underlying data may be joined with another data set, and then a new listing may be generated from the combined data set. As an example and not by way of limitation, a first data set may be listed on a private data exchange that includes NBA player shooting statistics over the last five years. A second data set may be listed on a different data exchange that includes weather data over the same period. These two data sets may be joined and listed as a new listing in either a private or public data exchange. Data consumers may then access this data set, subject to the viewing and access controls discussed herein, to gain insight into how the weather might affect player shooting percentages. Additionally, if data is listed on a public data exchange (e.g., a data exchange hosted by the cloud computing service 103), this data may be tunneled to a private data exchange.

Figure 12:
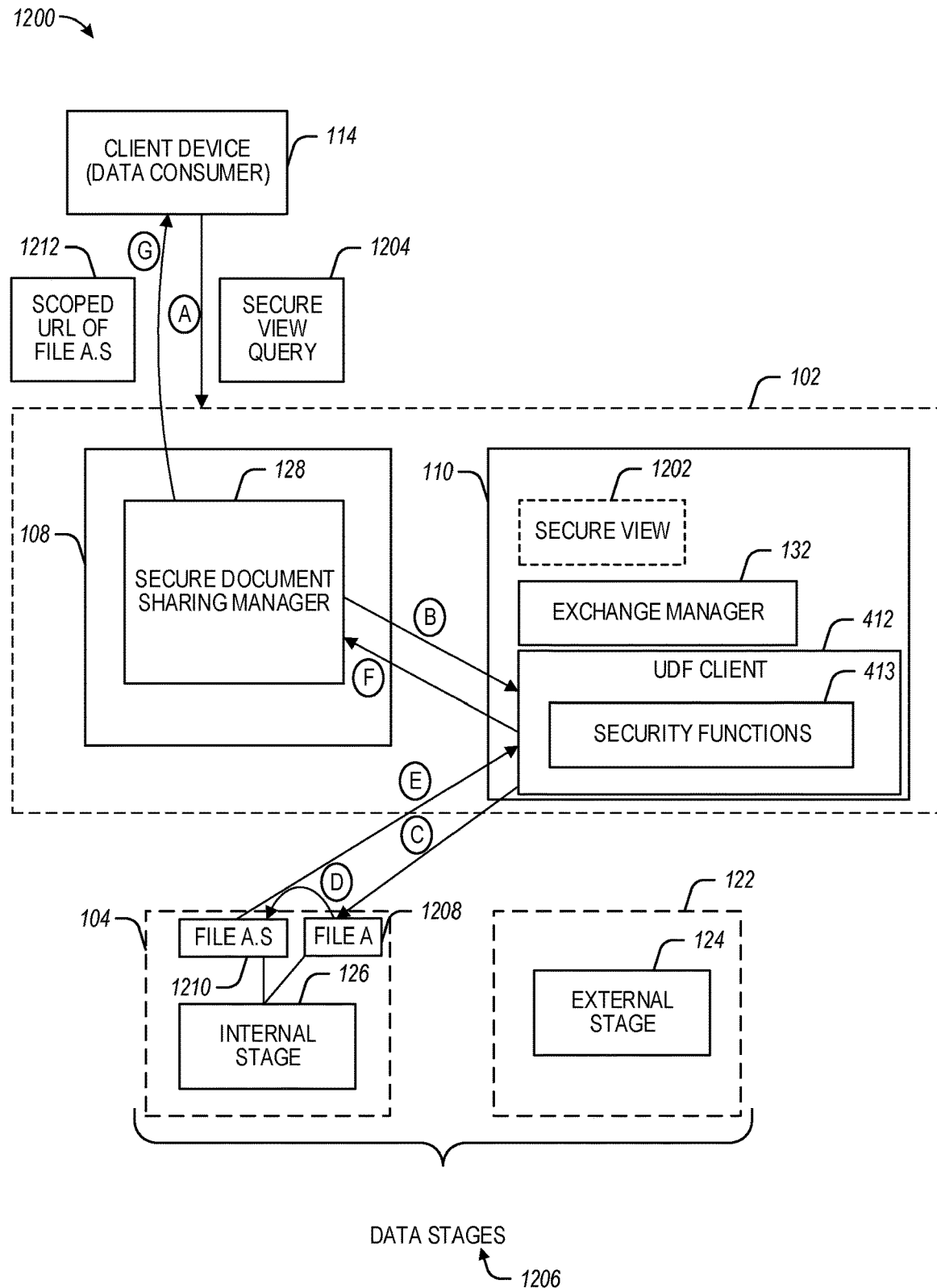
FIG. 12 illustrates an example computing environment with secure document sharing based on security functions performed by a UDF, in accordance with some embodiments of the present disclosure.

FIG. 12 illustrates an example computing environment 1200 with secure document sharing based on security functions performed by a UDF, in accordance with some embodiments of the present disclosure. Referring to FIG. 12, the computing environment 1200 is similar to the computing environment 100 and includes a client device (or devices) 114 in communication with a cloud computing platform with a network-based database system 102 and data stages 1206. The network-based warehouse system 102 includes the compute service manager 108 and the execution platform 110. The data stages 1206 include storage platform 104 with an internal stage 126 and cloud-storage platform 122 with an external stage 124. The compute service manager 108 is configured with the secure document sharing manager 128, and the execution platform 110 is configured with the exchange manager 132 and the UDF client 412.

The external stage 124 and the internal stage 126 store data (e.g., unstructured data files) associated with a data producer. In some aspects, the data producer generates a secure view 1202, which the data producer shares with a data consumer using the client device 114 via a data exchange (e.g., as discussed above in connection with FIG. 5-FIG. 11 and functionalities performed by the exchange manager 132).

At operation A, the data consumer uses client device 114 to access the secure view 1202 and generate a secure view query 1204 for a data set (e.g., a data file 1208 responsive to the query). The secure document sharing manager 128 receives the secure view query 1204 and, at operation B, invokes the UDF client 412 at the execution platform 110 to perform security functions 413 on data file 1208 which is responsive to the secure view query 1204. In some embodiments, a determination that data file 1208 is responsive to secure view query 1204 is made by the execution platform 110 including the UDF client 412. At operation C, the UDF client 412 locates the data file 1208 in internal stage 126 of storage platform 104, and, at operation D, performs security functions 413 on data file 1208 (e.g., file A) to generate a modified data file 1210 (e.g., file A. S). In some embodiments, the security functions 413 include watermarking (e.g., adding a watermark to generate the modified data file 1210 such as identification information of the data consumer account associated with the client device 114 sending the secure view query 1204), an edit password lock (e.g., requiring a password for editing the modified data file 1210), or a read password lock (e.g., requiring a password for reading the modified data file 1210).

At operation E, the modified data file 1210 is stored in the same stage as the data file 1208 (e.g., internal stage 126) and an indication that the security functions 413 have been applied and the modified data file 1210 is generated is communicated back to the UDF client 412 and the secure document sharing manager 128 (e.g., at operation F). At operation F, the secure document sharing manager 128 may further generate a scoped URL 1212 of the modified data file 1210. In some embodiments, the scoped URL 1212 may be generated by the execution platform 110 and is communicated to the secure document sharing manager 128 at operation F.

In some aspects, the scoped URL 1212 includes an encrypted hash associated with the modified data file 1210. In some embodiments, the encrypted hash of the scoped URL 1212 may further include identification information of the client device 114, a query ID of the received secure view query 1204, a file path associated with the storage location of the modified data file 1210, stage information for the stage including the storage location (e.g., storage platform location of the internal stage 126), and expiration period of the scoped URL 1212.

At operation G, the secure document sharing manager 128 communicates the scoped URL 1212 back to the data consumer at the client device 114 that originates the secure view query 1204. In subsequent processing functionalities, the secure document sharing manager 128 detects that the data consumer has activated (or selected) the scoped URL 1212 and performs additional authentication functions before granting the client device 114 access to the modified data file 1210. For example, the secure document sharing manager 128 performs the following functions: (a) authenticates the data consumer (e.g., the user of client device 114) using secure credentials associated with data consumer (e.g., user logging credentials), (b) validates that the logged-in user was the one who executed the secure view query 1204; (c) validates that the scoped URL 1212 is not expired; and (d) redirects the user to a short-lived (e.g., with a duration of 60 seconds or several minutes) pre-signed URL of the modified data file 1210 stored in internal stage 126 of the storage platform 104.

Figure 13:
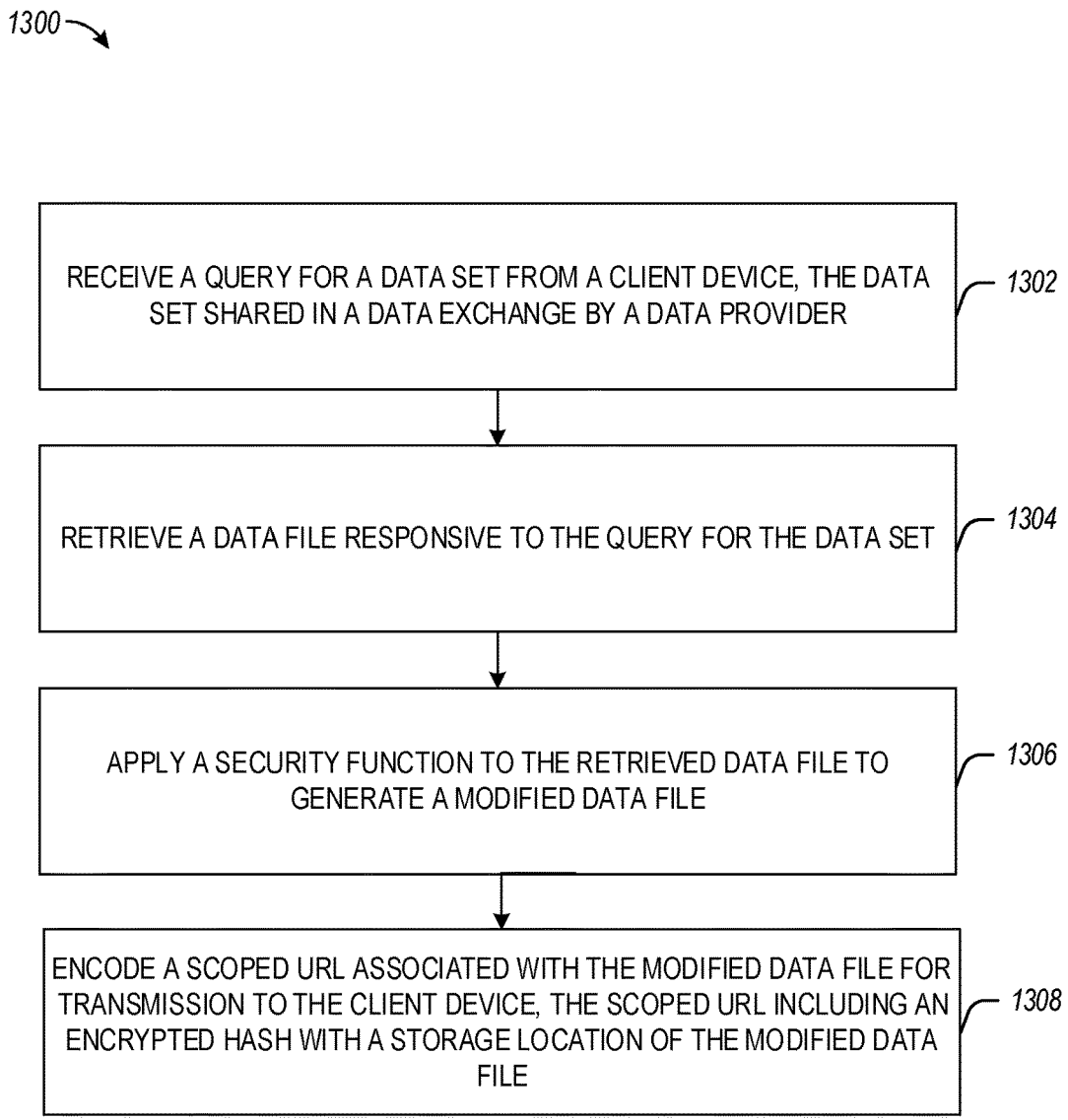
FIG. 13 is a flow diagram illustrating operations of a database system in performing a method for secure document sharing using security operations performed by a user-defined function (UDF) in a secure computing environment, in accordance with some embodiments of the present disclosure.

FIG. 13 is a flow diagram illustrating operations of a database system in performing a method 1300 for secure document sharing using security operations performed by a user-defined function (UDF) in a secure computing environment, in accordance with some embodiments of the present disclosure. The method 1300 may be embodied in computer-readable instructions for execution by one or more hardware components (e.g., one or more processors) such that the operations of the method 1300 may be performed by components of network-based database system 102, such as components of the compute service manager 108 and the execution platform 110. Accordingly, the method 1300 is described below, by way of example with reference thereto. However, it shall be appreciated that the method 1300 may be deployed on various other hardware configurations and is not intended to be limited to deployment within the network-based database system 102.

At operation 1302, a query for a data set is received from a client device, where the data set is shared in data exchange by a data provider. For example and about FIG. 12, a data consumer uses client device 114 to access the secure view 1202 and generates the secure view query 1204 for a data set (e.g., a data file 1208 responsive to the query) based on the shared secure view 1202. The secure document sharing manager 128 receives the secure view query 1204.

At operation 1304, a data file responsive to the query for the data set is retrieved. For example, the secure document sharing manager 128 receives the secure view query 1204 and invokes the UDF client 412 at the execution platform 110 to retrieve data file 1208.

At operation 1306, a security function is applied to the retrieved data file to generate a modified data file. For example, the UDF client 412 performs security functions 413 on the retrieved data file 1208 which is responsive to the secure view query 1204. The UDF client 412 locates the data file 1208 in internal stage 126 of storage platform 104 and performs security functions 413 on data file 1208 (e.g., file A) to generate a modified data file 1210 (e.g., file A.S).

At operation 1308, a scoped URL associated with the modified data file is encoded for transmission to the client device, the scoped URL including an encrypted hash with a storage location of the modified data file. For example, the secure document sharing manager 128 generates the scoped URL 1212 of the modified data file 1210 and communicates the scoped URL 1212 back to the client device 114 in response to the secure view query 1204.

In some aspects, the data set (e.g., secure view 1202) is shared by the data provider as a listing in the data exchange or is shared with an account of the client device in the data exchange. In some embodiments, the data set may include a stage of the data provider or a secure view (e.g., secure view 1202) of the data provider. In some aspects, the security function is a UDF executing on a virtual machine (e.g., a Java virtual machine) of the data provider. In some aspects, applying the security function includes applying a watermark to the retrieved data file, the watermark including identification information of the client device. Additionally, applying the security function may further include generating a random password, applying a password lock to the retrieved data file based on the random password, and encoding the random password for communication to the client device. In some aspects, the password lock is a read password lock or an edit password lock. In some embodiments, the above functionalities further include retrieving the data file (e.g., data file 1208) from a stage of the data provider (e.g., external stage 124 or internal stage 126) and storing the modified data file in the same stage.

Figure 14:
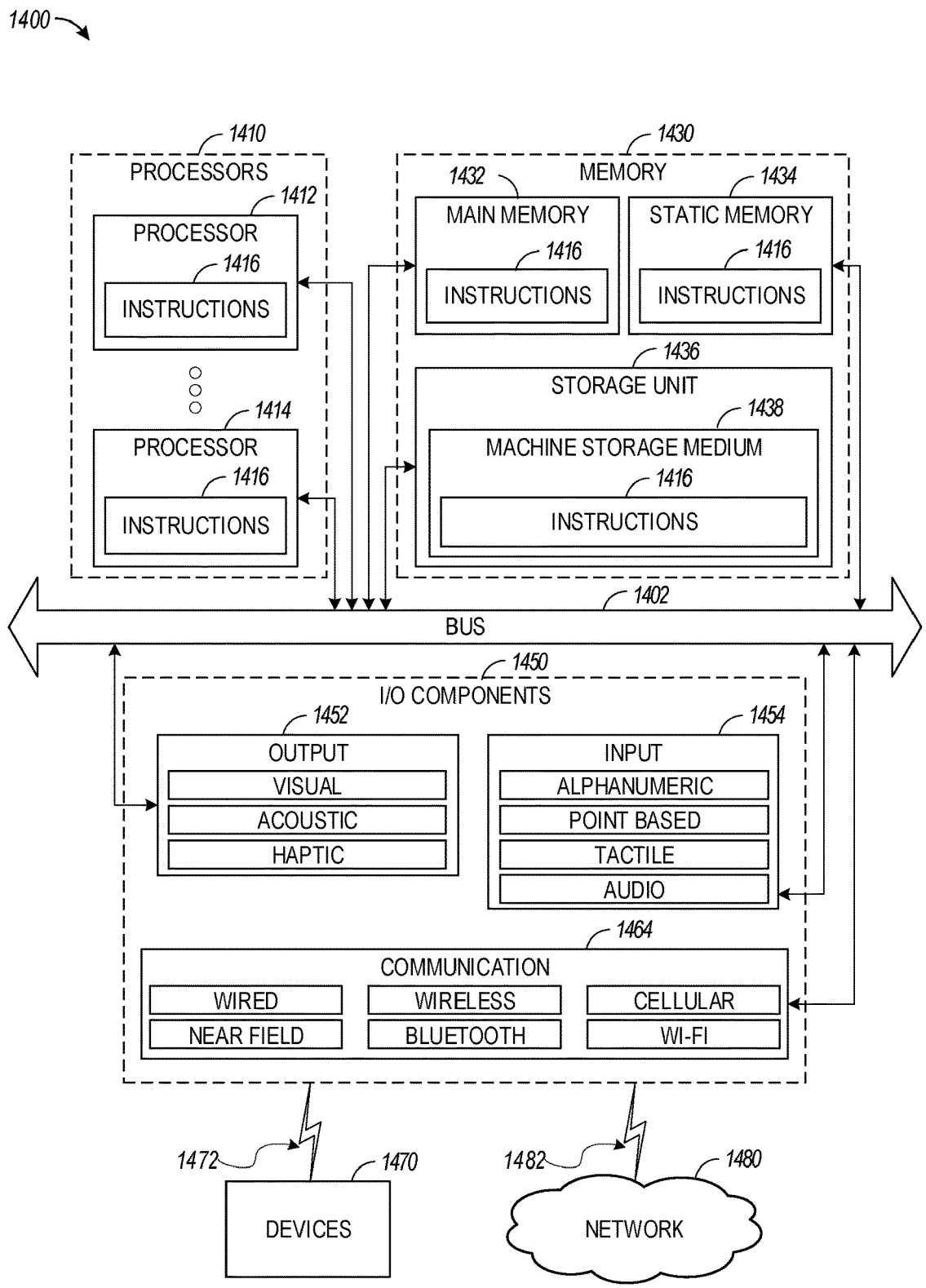
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, instructions 1416 may cause the machine 1400 to execute any one or more operations of the method 1400 (or any other technique discussed herein). As another example, instructions 1416 may cause the machine 1400 to implement one or more portions of the functionalities illustrated in at least FIG. 12. In this way, instructions 1416 transform a general, non-programmed machine into a particular machine 1400 (e.g., the compute service manager 108 or a node in the execution platform 110) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

Machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within machine storage medium 1438 of the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The device 1470 may be another machine or any of a wide variety of peripheral devices (e.g., a peripheral device coupled via a universal serial bus (USB)). For example, as noted above, machine 1400 may correspond to any one of the compute service manager 108 or the execution platform 110, and the devices 1470 may include the client device 114 or any other computing device described herein as being in communication with the network-based database system 102 or the cloud storage platform 104.

Executable Instructions and Machine Storage Medium

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of several well-known transfer protocols (e.g., hypertext transfer protocol (HTTP)). Similarly, instructions 1416 may be transmitted or received using a transmission medium via the coupling 1472 (e.g., a peer-to-peer coupling) to the device 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 1300 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of example.

Example 1 is a system comprising: at least one hardware processor; and memory storing instructions that cause the at least one hardware processor to perform operations comprising: receiving a query for a data set from a client device, the data set shared in data exchange by a data provider; retrieving a data file responsive to the query for the data set; applying a security function to the retrieved data file to generate a modified data file; and encoding a scoped uniform resource locator (URL) associated with the modified data file for transmission to the client device, the scoped URL including an encrypted hash with a storage location of the modified data file.

In Example 2, the subject matter of Example 1 includes, wherein the data set is shared by the data provider as a listing in the data exchange.

In Example 3, the subject matter of Examples 1-2 includes, wherein the data set is shared with an account of the client device in the data exchange.

In Example 4, the subject matter of Examples 1-3 includes, wherein the data set is one of a stage of the data provider; or a secure view of the data provider.

In Example 5, the subject matter of Examples 1-4 includes, wherein the security function is a user-defined function (UDF) executing on a virtual machine of the data provider.

In Example 6, the subject matter of Examples 1-5 includes, wherein applying the security function comprises: applying a watermark to the retrieved data file, the watermark including identification information of the client device.

In Example 7, the subject matter of Examples 1-6 includes, wherein applying the security function comprises: generating a random password; applying a password lock to the retrieved data file, the password lock based on the random password; and encoding the random password for communication to the client device.

In Example 8, the subject matter of Example 7 includes, wherein the password lock is a read password lock or an edit password lock.

In Example 9, the subject matter of Examples 1-8 includes, wherein the operations further comprise: retrieving the data file from a stage of the data provider, the stage comprising an external stage or an internal stage; and storing the modified data file in the stage.

In Example 10, the subject matter of Examples 1-9 includes, wherein the encrypted has of the scoped URL further comprises one or more of identification information of the client device; a query ID of the received query; a file path associated with the storage location of the modified data file; stage information for a stage including the storage location; and expiration period of the scoped URL.

Example 11 is a method comprising: receiving a query for a data set from a client device, the data set shared in a data exchange by a data provider; retrieving a data file responsive to the query for the data set; applying a security function to the retrieved data file to generate a modified data file; and encoding a scoped uniform resource locator (URL) associated with the modified data file for transmission to the client device, the scoped URL including an encrypted hash with a storage location of the modified data file.

Example 12 is a computer-storage medium comprising instructions that, when executed by one or more processors of a machine, configure the machine to perform operations comprising: receiving a query for a data set from a client device, the data set shared in a data exchange by a data provider; retrieving a data file responsive to the query for the data set; applying a security function to the retrieved data file to generate a modified data file; and encoding a scoped uniform resource locator (URL) associated with the modified data file for transmission to the client device, the scoped URL including an encrypted hash with a storage location of the modified data file.

Example 13 is at least one machine-readable medium including instructions that, when executed by processing circuitry, cause the processing circuitry to perform operations to implement any of Examples 1-12.

Example 14 is an apparatus comprising means to implement any of Examples 1-12.

Example 15 is a system to implement any of Examples 1-12.

Example 16 is a method to implement any of Examples 1-12.

CONCLUSION

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   invoking using a sandbox process, a user defined function (UDF) client to access a data file responsive to a query for a data set;
   applying using the UDF client, a security function to the data file to generate a modified data file;
   encoding a scoped uniform resource locator (URL) associated with the modified data file for transmission to a client device in response to the query, the scoped URL including an encrypted hash with a storage location of the modified data file and identification information of the client device; and
   granting the client device, access to the modified data file at the storage location, based on a validation of the client device using the identification information.

2. The system of claim 1, wherein the UDF client and the sandbox process reside in separate memory spaces of the at least one memory.

3. The system of claim 1, wherein the scoped URL includes a query ID of the query.

4. The system of claim 3, wherein the at least one hardware processor further performs operations comprising:
   performing the validation of the client device using the query ID; and
   granting the client device, access to the modified data file at the storage location based on the validation using the query ID.

5. The system of claim 4, wherein the data set is shared by a data provider as a listing in a data exchange.

6. The system of claim 5, wherein the data set is shared with an account of the client device in the data exchange.

7. The system of claim 6, wherein the data set is one of:
   a stage of the data provider; or
   a secure view of the data provider.

8. The system of claim 5, wherein the security function is a user-defined function (UDF) executing on a virtual machine of the data provider.

9. The system of claim 1, wherein applying the security function comprises:
   applying a watermark to the data file, the watermark including identification information of the client device.

10. The system of claim 1, wherein applying the security function comprises:
    generating a random password;
    applying a password lock to the data file, the password lock based on the random password; and
    encoding the random password for communication to the client device.

11. The system of claim 10, wherein the password lock is a read password lock or an edit password lock.

12. The system of claim 1, wherein the operations further comprise:
    retrieving the data file from a stage of a data provider, the stage comprising an external stage or an internal stage; and
    storing the modified data file in the stage.

13. The system of claim 4, wherein the encrypted hash of the scoped URL further comprises one or more of:
    a file path associated with the storage location of the modified data file;
    stage information for a stage including the storage location; and
    an expiration period of the scoped URL.

14. A method comprising:
    invoking using a sandbox process, a user defined function (UDF) client to access a data file responsive to a query for a data set;
    applying using the UDF client, a security function to the data file to generate a modified data file;
    encoding a scoped uniform resource locator (URL) associated with the modified data file for transmission to a client device in response to the query, the scoped URL including an encrypted hash with a storage location of the modified data file and identification information of the client device; and
    granting the client device, access to the modified data file at the storage location, based on a validation of the client device using the identification information.

15. The method of claim 14, wherein the UDF client and the sandbox process reside in separate memory spaces of at least one memory.

16. The method of claim 14, wherein the scoped URL includes a query ID of the query, and the method further comprising:
    performing the validation of the client device using the query ID; and
    granting the client device, access to the modified data file at the storage location based on the validation using the query ID.

17. The method of claim 14, wherein applying the security function comprises:
    applying a watermark to the data file, the watermark including identification information of the client device.

18. The method of claim 14, wherein applying the security function comprises:
    generating a random password;
    applying a password lock to the data file, the password lock based on the random password; and encoding the random password for communication to the client device.

19. The method of claim 18, wherein the password lock is a read password lock or an edit password lock.

20. The method of claim 14, further comprising:
retrieving the data file from a stage of a data provider, the stage comprising an external stage or an internal stage; and
storing the modified data file in the stage.

21. A non-transitory computer-storage medium comprising instructions that, when executed by one or more processors of a machine, configure the machine to perform operations comprising:
invoking using a sandbox process, a user defined function (UDF) client to access a data file responsive to a query for a data set;
applying using the UDF client, a security function to the data file to generate a modified data file;
encoding a scoped uniform resource locator (URL) associated with the modified data file for transmission to a client device in response to the query, the scoped URL including an encrypted hash with a storage location of the modified data file and identification information of the client device; and
granting the client device, access to the modified data file at the storage location, based on a validation of the client device using the identification information.

22. The non-transitory computer-storage medium of claim 21, wherein the UDF client and the sandbox process reside in separate memory spaces of at least one memory.

23. The non-transitory computer-storage medium of claim 21, wherein the scoped URL includes a query ID of the query, and wherein the operations further comprise:
performing the validation of the client device using the query ID; and
granting the client device, access to the modified data file at the storage location based on the validation using the query ID.

24. The non-transitory computer-storage medium of claim 21, wherein applying the security function comprises:
applying a watermark to the data file, the watermark including identification information of the client device.

25. The non-transitory computer-storage medium of claim 21, wherein applying the security function comprises:
generating a random password;
applying a password lock to the data file, the password lock based on the random password; and
encoding the random password for communication to the client device.

26. The non-transitory computer-storage medium of claim 25, wherein the password lock is a read password lock or an edit password lock.

27. The non-transitory computer-storage medium of claim 21, wherein the operations further comprise:
retrieving the data file from a stage of a data provider, the stage comprising an external stage or an internal stage; and
storing the modified data file in the stage.

* * * * *

UNITED STATES PATENT AND TRADEMARK OFFICE
CERTIFICATE OF CORRECTION

| | | |
|---|---|---|
| PATENT NO. | : 11,436,363 B1 | Page 1 of 1 |
| APPLICATION NO. | : 17/546546 | |
| DATED | : September 6, 2022 | |
| INVENTOR(S) | : Arikapudi et al. | |

It is certified that error appears in the above-identified patent and that said Letters Patent is hereby corrected as shown below:

On the Title Page

On page 2, in Column 2, under "U.S. Patent Documents", Line 2, delete "2020/0002671" and insert --2020/0026710-- therefor Signed and Sealed this
Twenty-seventh Day of June, 2023

Katherine Kelly Vidal
*Director of the United States Patent and Trademark Office*